United States Patent
Butler et al.

(10) Patent No.: US 6,365,069 B2
(45) Date of Patent: Apr. 2, 2002

(54) PROCESS OF INJECTION MOLDING HIGHLY CONDUCTIVE MOLDING COMPOUNDS AND AN APPARATUS FOR THIS PROCESS

(75) Inventors: Kurt I. Butler, Kingsville; Daniel G. Thomas, Conneaut, both of OH (US)

(73) Assignee: Quantum Composites Inc., Bay City, MI (US)

( * ) Notice: Subject to any disclaimer, the term of this patent is extended or adjusted under 35 U.S.C. 154(b) by 0 days.

(21) Appl. No.: 09/879,327

(22) Filed: Jun. 12, 2001

Related U.S. Application Data

(63) Continuation-in-part of application No. 09/849,629, filed on May 4, 2001, which is a continuation-in-part of application No. 09/526,641, filed on Mar. 16, 2000, now Pat. No. 6,251,308.
(60) Provisional application No. 60/125,138, filed on Mar. 18, 1999, and provisional application No. 60/211,582, filed on Jun. 15, 2000.

(51) Int. Cl.[7] .............................. H01B 1/22; H01B 1/24
(52) U.S. Cl. ...................... 252/511; 264/104; 264/105; 252/512
(58) Field of Search .................. 252/500, 511, 252/512; 264/104, 105, 24.21

(56) References Cited

U.S. PATENT DOCUMENTS

| | | | |
|---|---|---|---|
| 4,081,578 A | * | 3/1978 | van Essen et al. ............ 428/63 |
| 4,197,178 A | | 4/1980 | Pellegri et al. |
| 4,301,222 A | | 11/1981 | Emanuelson et al. |
| 4,339,322 A | | 7/1982 | Balko et al. |
| 4,908,157 A | | 3/1990 | Fontana et al. |
| 5,108,849 A | | 4/1992 | Watkins et al. |
| 5,230,966 A | | 7/1993 | Voss et al. |
| 5,250,228 A | | 10/1993 | Baigrie et al. |
| 5,268,400 A | | 12/1993 | Iseler et al. |
| 5,342,554 A | | 8/1994 | McBain et al. |
| 5,516,546 A | | 5/1996 | Hari et al. |
| 5,614,581 A | | 3/1997 | Cobbledick et al. |
| 5,686,199 A | | 11/1997 | Cavalca et al. |
| 5,744,816 A | | 4/1998 | Butler |
| 5,854,317 A | | 12/1998 | Rinz |
| 5,942,347 A | | 8/1999 | Koncar et al. |
| 5,998,510 A | | 12/1999 | Butler |
| 6,007,933 A | | 12/1999 | Jones |

FOREIGN PATENT DOCUMENTS

WO          WO 00/25372         4/2000

OTHER PUBLICATIONS

Handbook of Plastic Materials and Technology, Edited by Irvin I. Rubin, Robinson Plastics Corporation, Copyright 1990 by John Wiley & Sons, Inc., p. 679, Line 54.17 Low Profile Additives.
Krauss Maffei Plastics Machinery Technology, POLYSET/DUROSET Injection Molding Machines for Polyester BMC/SMS, Thermosets and HTV Silicones, pp. 1–7.

* cited by examiner

*Primary Examiner*—Mark Kopec
(74) *Attorney, Agent, or Firm*—Hudak & Shunk Co., L.P.A.

(57) ABSTRACT

A technique and apparatus are disclosed for injection molding highly filled conductive resin compositions. These compositions include one or more of unsaturated polyester and vinyl ester resin; a copolymer having a terminal ethylene group; and at least about 50 weight percent of an inorganic particulate conductive filler, an initiator, and a rheological modifier to prevent phase separation between said resin and said conductive filler during molding. The method of the present invention allows these compositions to be molded into highly intricate and thin electrically and thermally conductive specimens without significant post process machining. The method involves the use of an injection molding apparatus that has a hopper with an auger having a vertical component in its positioning to feed into the feed throat of an injection molding machine which has a phenolic screw that has been modified to have a constant inner diameter and a constant flight depth.

22 Claims, 5 Drawing Sheets

PROCESS OF INJECTION MOLDING HIGHLY CONDUCTIVE MOLDING COMPOUNDS AND AN APPARATUS FOR THIS PROCESS

CROSS REFERENCE

This patent application is a Continuation-In-Part of U.S. patent application Ser. No. 09/849,629 filed May 4, 2001 which is a Continuation-In-Part of U.S. application Ser. No. 09/526,641 U.S. Pat. No. 6,251,308 filed Mar. 16, 2000 which is based on U.S. Provisional Application Ser. No. 60/125,138 filed Mar. 18, 1999, and also claims priority from U.S. Provisional Application Ser. No. 60/211,582 filed Jun. 15, 2000.

FIELD OF INVENTION

The field of invention is molding processes for highly conductive compositions that are particularly useful for intricately molded conductive products, such as for example for fuel cell plates. These processes involve novel injection, and injection/compression molding processes.

These molding compositions can be formed into high definition complex configurations, including configurations, which are particularly suitable for injections molding techniques. For example, they can be molded into thin plate-like specimens (e.g. 60 to 200 thousandths of an inch) having an intricately patterned network of very narrow, relatively smooth, flow passages. Moreover in accordance with the present invention, these labyrinthine plates can be made substantially exclusively by molding, meaning that the need for complex and expensive machining processes is virtually eliminated. Such specimens are used as electrochemical cell bipolar plates. These plates desirably have a bulk conductivity of at least 40, 50, 60, 70, 80, 90 or even 96 S/cm. They also have desirable surface characteristics; heat, temperature, chemical and shrink resistance; strength; and cost.

BACKGROUND OF THE INVENTION

Conductive polymers have applications in providing alternatives to traditional conductive materials, which often involve greater labor expenses to manufacture into complex parts. In particular, in instances where the demand justifies significant volumes of a product, polymer-molding expenses may prove far more cost effective than comparable machining expenses for other materials. However in the past, it has proved difficult to achieve both a high level of conductivity and desirable molding characteristics. Generally, high-level weight percentages of an appropriate filler in a polymeric matrix are necessary to achieve satisfactory levels of conductivity. However, these high load levels lead to problems with the strength, durability, and moldability of the resulting composition One area in particular where it would be beneficial to solve the previously mentioned strength, durability, and molding issues is for application in fuel cells. Electrochemical fuel cells have great appeal as a potentially limitless energy source that is clean and environmentally friendly. These fuel cells can, in addition, be constructed at an appropriate scale for small-scale energy consumption, such as household use, or for industrial scale use, and even for commercial power generation. They have portable applications to power small appliances (such as computers or camping equipment), or automobiles and other forms of transportation. Although these different applications involve differences in size, the fundamental construction remains the same for generation of power varying from less than one to a few thousand kilowatts.

Basically, a fuel cell is a galvanic cell in which the chemical energy of a fuel is converted directly into electrical energy by means of an electrochemical process. The fundamental components of the fuel cell are an electrode comprising an anode and a cathode, eletrocatalysts, and an electrolyte. Work has been done in perfecting both liquid and solid electrolyte fuel cells and the present invention may find use in both types of fuel cells.

Solid electrolytes include polymeric membranes, which act as proton exchange membranes typically fueled by hydrogen. These membranes usually comprise a perfluorinated sulphonic acid polymer membrane sandwiched between two catalyzed electrodes that may utilize platinum supported on carbon as an electrocatalyst. Hydrogen fuel cells form a reaction chamber, which consumes hydrogen at the anode. At the cathode, oxygen reacts with protons and electrons at the electrocatalytic sites yielding water as the reaction product. A three-phase interface is formed in the region of the electrode and a delicate balance must be maintained between the electrode, the electrolyte, and the gaseous phases.

Systems involving the use of other electrolytes have been also been studied. These would include alkaline fuel cells, phosphoric acid fuel cell, molten carbonate fuel cells, and solid oxide fuel cells. However, the principles are similar, as are some of the issues in perfecting these products.

A fuel cell reactor may comprise a single-cell or a multi-cell stack. In any case, the cell includes at least two highly conductive flow field plates that serve multiple functions. These plates may function as current collectors that provide electrical continuity between the fuel cell voltage terminals and electrodes. They also provide mechanical support (for example for the membrane/electrode assembly). In addition, these plates act to transport reactants to the electrodes and are essential to establishing the previously mentioned delicate phase balance.

Typically, the fuel cell plates are thin relatively flat plate members that include a highly complex network of interconnecting channels that form the flow field area of the plate. The configuration of these channels is highly developed in order to maintain the proper flow of reactants and to avoid channeling or the formation of stagnant areas, which results in poor fuel cell performance. It is critical that the flow of the reactants is properly managed, and that the electrocatalysts are continuously supplied with precisely the appropriate balance of reactants. Thus, it is essential for the plates to define and maintain clear passages within the highly engineered flow labyrinth. Moreover, in order to assure a satisfactory life, the plates must be able to resist surface corrosion under a variety of conditions. For example, fuel cells may be placed outside and subject to ambient weather. Thus, the cells must be resistant to stress cracking and corrosion at temperature ranging from −40 to 200 degrees Fahrenheit. Further, since the conditions within the cell are corrosive, the cells must also be resistant to chemical attack at these temperatures from various corrosive substances. For example, the plates may be subjected to de-ionized water, methanol, formic acid, formaldehyde, heavy naptha, hydrofluoric acid, tertafluoroethylene, and hexafluoropropylene depending on the fuel cell type. Moreover, the conditions within the fuel cell may lead to elevated temperatures, i.e. from 150 to 200 degrees Fahrenheit, as well as elevated pressures, i.e. from ambient to 30 p.s.i. Corrosive decomposition needs to be avoided since it almost certainly would cause a system failure by changing the flow patterns within the fuel cell.

Past attempts at solving the various requirements for fuel cell plates have included the use of metal and machined graphite plates. The use of metal plates result in higher weight per cell, higher machining costs and possibly corrosion problems. Machined graphite plates solve the weight and corrosion problems but involve high machining cost and result in fragile products, especially when prepared as very thin plates. Some use of graphite/poly(vinylidene fluoride) plates has been made but these have been characterized as being expensive and brittle and having long cycle times.

U.S. Pat. No. 4,197,178 is incorporated herein for its teaching of the working and compositions of electrochemical cells. U.S. Pat. No. 4,301,222 is incorporated herein for its teachings on graphite-based separators for electrochemical cells.

SUMMARY OF THE INVENTION

In the past, known conventional bulk molding compounds have been modified to be conductive by the addition of large amounts of conductive filler, such as graphite. During molding it was observed that the liquid resin phase separated from the filler and was exuded from the molding. Further, it was observed that this occurrence tended to cause cracking in molded specimens that were thin. Moreover, bulk conductivity measurements at different locations within the specimen were inconsistent. In accordance with the present invention, it was discovered that compositions could be formulated which solved the foregoing issues. In particular, the formulations involve the use of a resin matrix with high loadings of a conductive filler; various additional additives, such as initiators, mold-release agents, and carbon black; and optionally one or more rheological agents selected from the group comprising group II oxides, alkaline earth oxides, carbodiimides, polyisocyanates, polyethylene and polytetramethylene fluoroethyl. One possible explanation for the mechanism by which the molding agents work, is that they act to build the apparent molecular weight of the prepolymer (e.g. vinyl ester resin or unsaturated polyester resin). Alternatively, these agents may promote flow such as by reducing shear during molding. The use of these rheological agents eliminates phase separation, as well as cracking and inconsistent conductivity measurements. It is anticipated that these problems are a result of the complex configuration of the specimens being molded along with the very high concentrations of conductive filler.

In addition to solving molding and cracking problems it is anticipated that other properties such as the coefficient of thermal expansion, electrical and thermal conductivity, shrink resistance and mechanical properties may be more uniform and/or otherwise improved as a result of the use of the present invention. In addition to the foregoing improvements it was found that a resin composition of the invention demonstrated a higher glass transition temperature and resulted in an improvement in the hot strength of the molded part. Further improvements are also possible by optimizing both gel time and cure time for the prepolymer by controlling initiator type and amount and inhibitor type and amount. Additionally, the compositions can include the use of a low shrink additive is added to the composition which acts to help perfect the surface characteristics of the molded plate made in accordance with the invention. These additives are generally used in the range of 10 to 50 weight percent based on the total weight of the additive and the resin system, i.e. the resin and any monomers. For the purpose of this invention, the term "low shrink additive" is used but may encompass additives which are also termed "low profile additives" and help to reduce the roughness of the surface. Resins may have a tendency to shrink during cure which results in surface defects such as sink marks and microscopic irregularities. Other problems include internal voids and cracks, as well as warpage and inability to mold to close tolerances. For molded fuel cell plates, these imperfections inhibit the ability of the resultant product to contact the proton exchange membrane. The "low profile additives" of the present invention help to compensate for shrinkage and improve the surface smoothness. Further, eliminating the shrink problems results in better stacking of the plates and a better overall fuel cell.

The foregoing improvements in specimens molded from these compositions enable the low cost mass production of bipolar plates as an additional embodiment of the invention. These could be used for portable fuel cells, as well as stationary power units.

In accordance with the invention, the following compositions can be used in a new molding process to accomplish injection molding. In particular, the process of the present invention involves using a double auger to convey the highly loaded molding compositions of the present invention to the feed throat of an injection molding apparatus. Alternatively, it has also been found that a single auger, such as is found in an injection molding machine sold by Krauss Maffei with an AZ100 stuffing unit and a 60 mm screw and barrel for thermoset BMC, can be used where the auger is disposed at a angle of between about 30 and 60 degrees to the horizontal plane of the feed throat. More particularly, the angle is about 45 degrees plus or minus 5 degrees. These processes together contrasts to the traditional process using a hydraulic ram to port the molding composition to the feed throat. However, the traditional molding methods and equipment would fail with potentially catastrophic results when the composition would pack out during the molding process. As compared to these traditional methods, it is preferred that a double auger system with a first and larger horizontally oriented screw, which feeds the smaller vertical type auger feeding into the feed throat. Further, the process involves some zoned temperature gradients with a first and second zone in the first screw barrel having a temperature of from about 70 to about 125 degrees F., and more particularly about 70 to about 100 degrees F. A third zone is located at the mold. This zone is maintained at about 275 to about 325 (i.e. 300 F) which is the temperature at which cure is initiated for most of the compositions in accordance with the invention. It is preferable to avoid temperature variations at the mold level. At normal cure rates, the mold time is typically around 10 to 600 seconds, or more usually 30 to 300 seconds or around one or two minutes. The process can be practiced for single or double gate cavity tools, or even for injection/compression processes in which the mold is slightly opened during fill and the mold is shut to compress the shot.

DETAILED DESCRIPTION OF THE INVENTION

Figure 1:
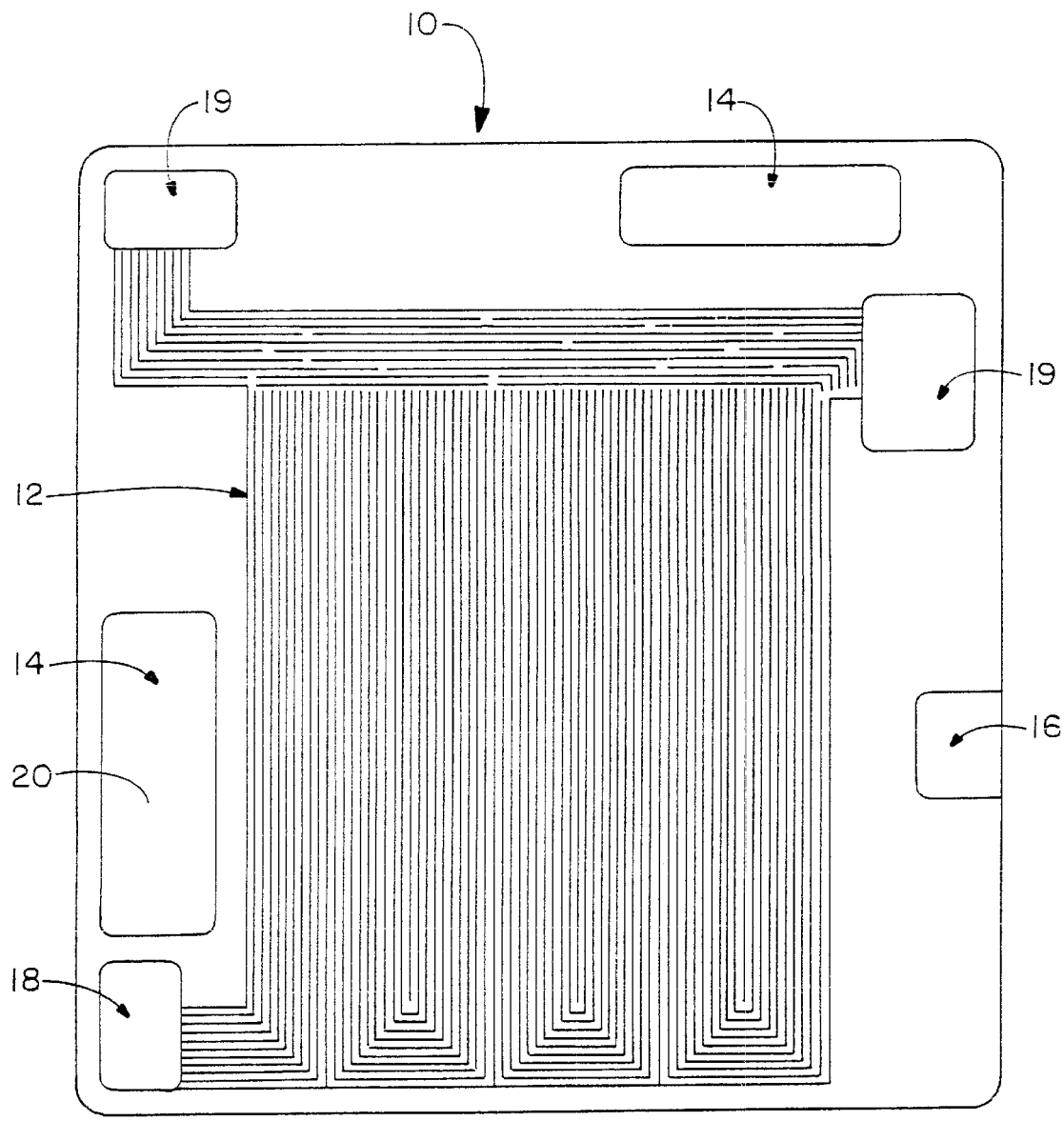
FIG. 1 is an illustration of a bipolar fuel cell plate that can be made in accordance with the present invention.

The invention relates to improvements in processes and equipment for molding highly conductive molding compositions. In particular, the compositions can be used in injection molding processes, and in injection/compression molding processes. These processes are cost effective because they eliminate labor intensive machining, and because of repeatability with respect to shot to shot. The processes further have better ability to control shot to shot cross parting line thickness. Further these molding processes enable the production of thin and intricate specimens that have high concentrations of conductive filler.

Sheet molding and bulk molding compositions are described in U.S. Pat. Nos. 5,998,510; 5,342,554; 5,854,317; 5,744,816; and 5,268,400; all of which are hereby incorporated by reference for their teachings on the various modifications to molding compositions that are known to the art.

One component of a molding resin composition is a crosslinkable prepolymer such as an unsaturated polyester resin or vinyl ester resin. Desirably the prepolymer has a relatively low molecular weight such as from about 200 to about 5000 (weight average). They are described in detail with examples in the above patents incorporated by reference. The polyester resins are the condensation product derived from the condensation of unsaturated polybasic acids and/or anhydrides with polyols such as dihydroxy or trihydroxy compounds. Desirably, these polyester resins are the esterification reaction product of diacids, or anhydrides of diacids, generally having from about 3 to about 12, or more preferably from about 4 to about 8 carbon atoms, with a polyol or a cyclic ether having from about 2 to about 12, or more preferably from about 2 to about 6 carbon atoms.

In general, the vinyl ester resins that can be used are the reaction products of epoxy resins and a monofunctional ethylenically unsaturated carboxylic acid. More specifically, these vinyl ester resins are the reaction product of an epoxy terminated oligomer, for example, an epoxy functionalized bisphenol A with an acrylic acid, or methacrylic acid forming acrylic terminal groups on the oligomer. The vinyl esters have predominantly terminal unsaturation while the unsaturated polyesters have predominantly internal unsaturation.

Another component of the molding composition is one or more unsaturated monomers that are copolymerizable with the resin. Desirably, this component is capable of dissolving the resin component at room temperature. Thus, in one embodiment the resin is dissolved in the monomeric component prior to being combined with the remaining components. Examples of suitable monomers are styrene, alpha-methyl styrene, chloro-styrene, vinyl toluene, divinyl benzene, diallylphthalate, methyl methacrylate, and mixture of these, with preferred monomers being styrene and methyl methacrylate. The ratio of monomer(s) to resin is desirably from about 40:60 to about 75:25 and preferably from about 40:60 to about 65:35 by weight.

Another component to the molding composition is fillers. In accordance with the invention the predominant filler is a conductive filler in order to impart electrical conductivity of the final molded product. A preferred filler is graphite particles, in particular, a synthetic crystalline graphite particle, such as currently supplied by Asbury Graphite in Asbury, N.J. under the designation Asbury 4012. This graphite is characterized as having less than 10% particles greater than 150 microns and less than 10% smaller than 44 microns in diameter. Other graphite fillers include: Ashbury A99, Ashbury 3243, Ashbury modified 4012, Ashbury 3285, Ashbury 230U; TimrexR KS 75 and 150, and TimrexR KC 44, all sold by TIMCAL of Westlake, Ohio; and Calgraph Sold by SGL Technic Inc of Valencia, Calif. This filler is used at a loading of at least 50% by weight. Other conductive fillers such as other forms of graphite (including graphite pitch-based fibers), metal particles, or metal coat particles may be used in conjunction with the graphite filler, or even alone. Desirably conductive fillers are at least about 50, about 60, or about 65 weight percent of the molding composition. More desirably the filler is more than about 70 or 75 percent to about 80 weight percent of the molding composition. Alternatively this amount can be expressed as at least about 250 phr, more preferably at least about 275, or even 300 phr. Alternatively stated the conductive fillers are present in an effective amount to result in a bulk conductivity of at least about 40, about 50, about 60, about 70, about 80, about 85, about 90 or about 96 S/cm when measured in accordance with ASTM Test Standard No. F1529-97 for a molded article having a thickness from about 0.060 to about 0.200 inches. Current technology in fuel cell plates uses a bulk conductivity of at least about 55 S/cm, and preferably at least about 70.

An initiator is another component of the molding composition. The initiator initiates the copolymerization of the resin and the monomer(s). Initiators include any free radical initiator capable of forming radicals in the correct concentration under the molding conditions. They may include peroxides, hydroperoxides, redox systems, diazo compounds, persulfates, perbenzoates etc. The initiators are typically used in amounts of about 0.05 to about 5 weight percent, and more preferably about 0.1 to about 2 weight percent. Alternatively, these amount can be expressed in parts per hundred parts by weight of resin, i.e. from about 0.5 to about 4.0 phr, preferably from about 0.7 to about 3.0 phr, and most preferably from about 0.8 to about 2.25 phr. Alternatively high temperature initiators such as Di-cup, e.g. dicumyl peroxide can be used for molding applications where higher initiation temperatures are desirable. The inclusion of 0.5 to 10 phr, preferably about 1 to 8 phr, of a mold release agent, such as calcium stearate, zinc stearate, or the like may also be of advantage to achieving without machining the highly complex molded part of the present invention.

Another optional component to the improved molding composition is a rheological modifier, which may act to increase the molecular weight such as by chain extension of the resin prepolymer. Suitable modifiers include Group II oxides and hydroxides, such as calcium or magnesium oxide; carbodiimides; aziridines; and polyisocyanates. It is believed that the foregoing modifiers act chemically by co-reacting into the polymer backbone at carboxy or hydroxy sites. Other suitable modifiers include polytetrafluoroethylene (PTFE); perfluoropolyether (PFPE), and polyethylene. These modifiers may act to reduce shear and thus promote flow in the composition during molding. Fumed silica is an example of a substance, which may act mechanically to increase molding viscosity and therefore be a suitable rheological modifier for this invention. Combinations of two or more rheological modifiers may be desirable for optimum properties. In this application they are used to modify the resin structure to prevent phase separation of the resin from the conductive filler (in particular in view of the high loadings of the conductive filler, i.e. over 50% or even 65% by weight or more of graphite) The modifiers are further used in general to enable the achievement of a high definition conductive polymeric fuel cell plate.

Desirably the rheological modifiers are used in an effective amount to prevent phase separation during molding. For the purpose of this application molding will desirably be at pressures from about 400 to about 5000 psi, and preferably from about 2000 to about 3500 psi, and most preferably from about 2500 to about 3000 psi. Desirable amounts of group II oxides (including group II hydroxides and mixtures of these compounds) is from about 0.1 to about 1 or about 2 weight percent, more desirably from about 0.2 or about 0.3 to about 0.7 or about 0.8 weight percent. This can also be expressed as from about 0.5 to about 4.0 phr, preferably from about 1.0 to about 3.0 phr, and most preferably from about 1.5 to about 2.5 phr. Specific preferred compounds include magnesium oxide, or magnesium hydroxide or calcium oxide. Examples of a suitable magnesium oxide additives is 99% pure magnesium oxide sold under the tradename "Elastomag" from Morton Thiokol, Inc. in Danvers, Mass. Other examples include a magnesium oxide dispersion sold under the tradename "pg-9033" by plasticolors, and a magnesium hydroxide dispersion also sold by plasticolors under the tradename "pg-91146". Another suitable magnesium hydroxide is Barcroft, which is a powdered version. Examples of aziridine compounds include polyfunctional aziridines supplied by EIT, Inc. under the trade designation XAMA, including XAMA-2, which is identified as trimethylol propane-tris (beta-(N-aziridinyl) proprionate), and, in particular, XAMA-7, which is identified as pentaerythritol-tris-(beta-(aziridinyl) proprionate); a product of Sybron Chemicals, under the tradename Ionac including PFAZ-322, identified as a trifunctional aziridine; and including CX-100, a product of Zeneca Resins, identified as a polyfunctional aziridine. Desirable amounts of aziridine and/or polyisocyanate modifiers is from about 1 to about 10 or about 15 weight percent, and more desirably from about 2 or about 3 to about 8 or about 9 weight percent. This can also be expressed as from about 0.5 to about 20 phr, preferably from about 1 to about 17 phr, and most preferably from about 2 to about 15 phr. Polyisocyanates in general are described in more detail in U.S. Pat. No. 5,268,400 column 6 lines 59 through column 7 line 17. A specific diisocyanate, which can be used is diphenylmethane diisocyanate such as that sold by ICI Americas of Wst Deptford, N.J., under the tradename "Rubinate R MF-1780. Additionally, a suitable diisocyanate is Lupranate MP102, solvent free urethane-modified diphenylmethane diisocyanate from BASF. Desirable amounts of polytetrafluoroethylene (PTFE) (and/or perfluoropolyether (PFPE)) is from about 0.5 to about 1 or about 2 weight percent, more desirably from about 0.6 or about 0.7 to about 1.8 or about 1.3 weight percent. This can also be expressed as from about 0.5 to about 20 phr, preferably from about 3 to about 15 phr, and most preferably from about 5 to about 12 phr. A suitable fine particle PTFE powder (having an average particle size by Coulter Counter of less than microns) is sold under the tradename "Marzon #5 by Marshall Products Company of West Chester Pa. It is preferable to use a linear low density polyethylene such as sold by Equistar of Houston Tex. under the tradename FN 510. It is preferable to use it in amounts of from about 3 to about 20 phr, more preferably from about 4 to about 17, and most preferably from about 5 to about 15 phr/Fumed silica could be used at from about 0.5 to about 20 phr, preferably from about 1 to 10 phr.

Other optional components to a molding composition include urethane based or urethane containing oligomers or polymers, low shrinkage additives like polyvinyl acetate or polyethylene; fibrous reinforcing agents such as cotton glass microfibers or graphite microfibers; flexibilizing agents; mold release agents; polymerization inhibitors to inhibit premature polymerization during storage or the initial stages of molding; viscosity modifiers like fumed silica; and mold lubricant like stearates of calcium, zinc or magnesium. Carbon black may be added to influence the surface conductivity and to change the appearance of the molded product. Suitable carbon blacks include an electrically conductive low residue carbon black having a nitrogen surface area m2/g of 270, a STSA surface Area m2/g of 145 a sieve residue at 35 mesh of 0 ppm and at 325 mesh of 20 ppm as sold under the tradename Conductex 975 by Columbia Chemicals of Jamesburg, N.J. Also, suitable conductive carbon black is supplied by Akzo Nobel Chemicals of Chicago, Ill. under the tradename Ketjenblack EC-300 J and EC-600JD. Cabot Corporation of Boston Mass. also supplies a conductive carbon black. Wherever possible given enough other information take out the product designation. It is noted that polyethylene and fumed silica can function as the rheological modifier in addition to the foregoing functions.

As a further embodiment of the invention, low shrink additives can advantageously be added to improve the surface characteristics and the dimensional stability of the resulting products. As previously mentioned "low profile additives" are also encompassed within this aspect of the invention. These additives generally include thermoplastics or elastomerics such as homoploymers of ethylene, styrene, vinyl toluene, alkyl methacrylates, polyethylene ether, polyphenylene oxide and alkyl acrylates. Additional examples include copolymers using the foregoing and in addition, vinyl chloride, vinyl acetate, acrylonitrile, and butadiene. In particular these co-polymers would advantageously include copolymers of vinyl chloride and vinyl acetate; styrene and acrylonitrile; methyl methacrylate and alkyl esters of acrylic acid; methyl methacrylate and styrene; methyl methacrylate and acrylamide; and SBS block copolymers. These additives are generally used in the range of 10 to 50 weight percent based on the total weight of the additive and the resin system, i.e. the resin and any monomers. More preferably this range would be 20 to 45 weight percent, with a particularly preferred range of about 30 to 40 weight percent. These additives are usually added with the resin blending. As necessary the cure system may be adjusted to compensate for the presence of the additive.

The molding compositions may be formulated and mixed using a variety of mixing conditions including either continuous or batch and using a variety of known mixing equipment. Specific examples are set forth in the example section. The compositions may be advantageously stored for reasonable times before molding. The compositions can be molded by a variety of methods including compression molding and injection molding. The compositions can be molded under typical conditions for these types of molding including at pressures from about 400 to about 5000 psi, and preferably from about 2000 to about 3500 psi, and most preferably from about 2500 to about 3000 psi and temperatures at from about 225 to about 400 degrees Fahrenheit. Dwell times are from about 50 seconds to about four minutes. The compositions are useful for molding complex configurations including thin or intricate conductive articles such as those having a thickness from about 0.020 to about 0.200 inches, and more preferably from about 0.040 to about 0.150 inches. The compositions are useful for articles having bulk conductivity of at least 40, 50, 60, 70, 80, 85, 90 or even 96 S/cm at a thickness given above. The articles from the composition desirably have tensile strength from about 2000 to about 6000 psi as measured in accordance with ASTM test No.638 and flexural modulus from about 3000 to about 10,000 psi when tested in accordance with ASTM test no. D790.

Molded products made from the compositions of the present invention are useful for a variety of applications demanding complex configurations, conductivity, as well as strength, and corrosion resistance. One particularly advantageous product, which can be made by compression molding, is a bipolar plate for use in fuel cells. An example of such a plate is shown in FIG. 1. The drawing of this plate is intended to illustrate the molding capabilities of the conductive compound of the present invention. It is not necessarily intended to provide optimal, or even operative, field flow design. It should not limit the invention in any way. The plate 10 includes a fluid flow face with one or more generally parallel and or serpentine flow channels 12. The flow channels receive and transmit fluids through ports 14 and 16, which are in fluid communication with corresponding entry and exit fluid manifolds 18 and 19. The plate has a dimension, which will vary from 1 to 20 inches in length and width, and having a thickness of 0.02 to 0.3 inch, with a cross-sectional depth of the flow channel in the range of about 0.005 to 0.080 inch. The cross-sectional width of a land separating adjacent flow channel sections is in the range of 0.01 to 0.1 inch. The plate may include a number of peripheral through holes that act as a manifold for fuel transportation. The plate made using the compositions of the present invention can be made substantially exclusively by molding operations. The intricate pattern can be established without the need for expensive, post plate production machining operations, such as drilling, or reaming or the like.

Figure 2:
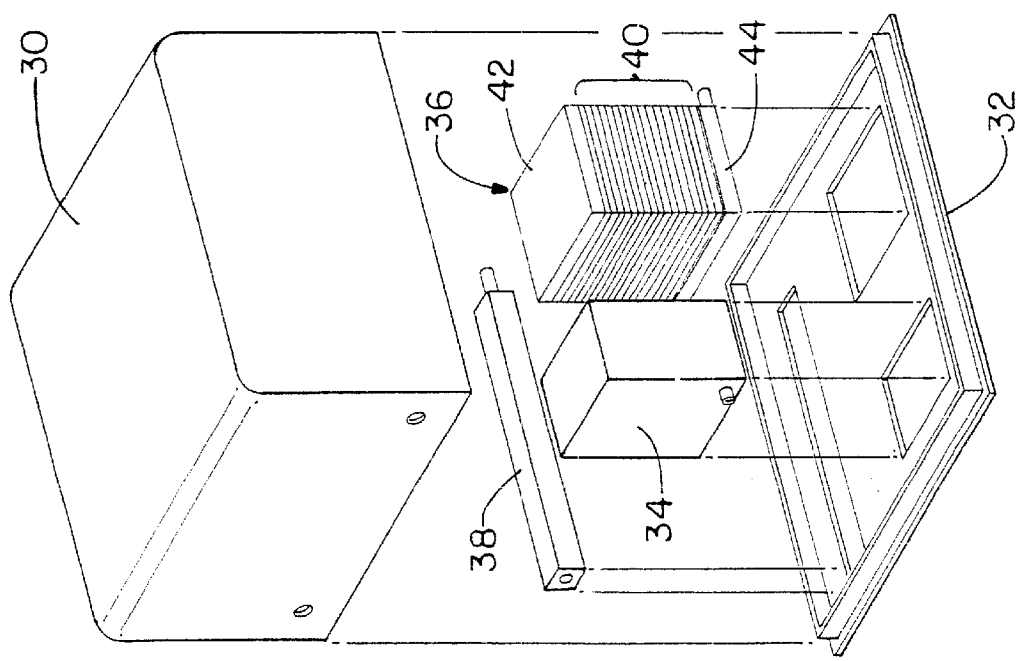
FIG. 2 is an illustration of a fuel cell assembly utilizing a bipolar cell plate.

FIG. 2 illustrates the unassembled components of a fuel cell. This fuel cell has a base unit 32 which includes debossed means to accept a reformer 34 and a fuel cell stack 36 which is comprised of a plurality of bipolar plates 40 which are sandwiched between a stack cap 42 and a stack base 44. The fuel cell further includes a heat exchanger 38. An enclosure 30 provides a leak-proof housing for the unit.

EXAMPLES

The following examples use the components set forth below.

Resin A is Hetron 922 available from Ashland Chemical Co in Columbus Ohio. It is a low viscosity epoxy vinyl ester resin. It is about 55 wt. % solids and about 45 wt. % reactive monomer.

Resin B is Atlac 382ES from Reich hold Chemicals, Inc. in Research Triangle Park, N.C. It is characterized as a bisphenol fumarate resin. It was diluted to about 55 wt. % solids with styrene.

Resin C is Dion 6694 diluted to 55 wt. % solids in styrene. It is available from Reichhold Chemicals, Inc. It is characterized as a modified bisphenol fumarate polyester.

Resin D is 42-2641 from Cook Composites and Polymers in Kansas City, Mo. It was diluted to 55 wt. % solids with styrene. It is characterized as an unsaturated polyester resin.

Resin E is ATLAC 3581-61 from Reichhold Chemicals, Inc. It is characterized as a vinyl ester resin at 19 wt %, polyester at 27 wt % and urethane polymer at 4 wt % combined with 50 wt % styrene. Thus, it was diluted to 50 wt % solids with styrene.

Resin F is 580-05 from Reichhold Chemicals, Inc. It is characterized as a urethane-modified vinyl ester resin. It was diluted to 54 wt % solids with styrene.

Resin G is 9100 from Reichhold Chemicals, Inc. It is characterized as a bisphenol-epoxy vinyl ester. It was diluted to 54–58 wt % solids with styrene.

Resin H is Dow Derakane R8084 from Dow Chemicals, Inc. It is characterized as an elastomer-modified vinyl ester resin. It was diluted to 50–60 wt % solids with styrene.

Resin I is 9480-00 from Reichhold Chemicals, Inc. It is characterized as an epoxy novolac vinyl ester. It was diluted to 53.5 wt % solids with styrene.

Resin J is Atlac 31-632 from Reichhold Chemicals, Inc. It is an unsaturated isocyanurate vinyl ester resin.

Resin K is Dow Derakane 797 from Dow Chemicals, Inc. It is characterized as a one pack resin which is an epoxy vinyl ester resin containing 7–13 weight percent of divinyl benzene, 5–15 weight percent of styrene butadiene rubber co-polymer, 2–6 weight percent of styrene homopolymer, and 0.5 to 1.5 weight percent of styrene-ethylene oxide block copolymer, as a low profile additive. It was diluted to 60–65 wt % solids with styrene.

Resin L is Dow Derakane 790 from Dow Chemicals, Inc. It is also characterized as a one pack resin which is an epoxy vinyl ester resin containing 5–15 weight percent of styrene butadiene rubber co-polymer, 2–6 weight percent of styrene homopolymer, and 0.5 to 1.5 weight percent of styrene-ethylene oxide block copolymer, as a low profile additive. It was diluted to 50–60 wt % solids with styrene.

Resin M is 31633-00 from Reichhold Chemicals, Inc. It is characterized as a isocyanurate vinyl ester resin with 4 wt % polyether polyol. It was diluted to 60 wt % solids with styrene.

Resin N is Dow Derakane 780 from Dow Chemicals, Inc. It is also characterized as a vinyl ester resin. It was diluted to 60–70 wt % solids with styrene.

Monomer A is styrene.

Monomer B is Divinylbenzene HP from the Dow Chemical Company and characterized as 80 wt % divinyl benzene, 18 wt % ethyl vinylbenzene, less than 0.12 wt % p-tert butylcatechol, less than 0.5 wt % diethylbenzene and less than 1 wt % of Napthalene.

Rheological Modifier A is Elastomag from Morton Thiokol. Inc. in Danvers, Mass. It is characterized as 99% pure magnesium oxide.

Rheological Modifier B is a polyisocyanate. The material used in these experiments is 40-7263 from Cook Composites and Polymers. It is characterized by a NCO content of 17.7 to 20.9, a viscosity of 110–170, a flash point of 87° F., and a crystallization point of 40° F.

Rheological Modifier C is RCI RD THL55 (also known as RD-1070) from Reichhold, Inc. It is specifically a polyurethane resin.

Rheological Modifier D is Rubinate 1780 available from ICI. It is characterized as a polymeric methylene diphenyl diisocyanate.

Rheological Modifier E is Marzon #5 from Marshall Products Company of West Chester, Pa. It is characterized as a finely divided powder polytetrafluoroethylene.

Rheological Modifier F is FN-510, a linear low-density polyethylene from Equistar Chemicals, L.P. of Houston, Tex.

Initiator A is Vazo (2,2-azo bisisobutyronitrile) available from Dupont, I & B Industrial and Biochemical Dept, Wilmington Del.

Initiator B is tert-butyl peroxy isopropyl carbonate (Triginox BPIC) available from Durr Marketing in Pittsburgh, Pa.

Initiator C is t-butylperbenzoate (TBPB) available from Durr Marketing.

Initiator D is 1,3 di-t-butyl peroxy-3,5,5 trimethylcyclohexane catalyst (Trig 29B75) available from Durr Marketing.

Mold release agent A is calcium stearate.

Mold release agent B is zinc stearate sold as COAD 27 by the Norac Company, Incorporated of Azusa, Calif.

Graphite A is graphite 4012 available from Asbury Graphite in Asbury, N.J. It is characterized by having less than 10% greater than 150 microns and less than 10% smaller than 44 microns in diameter.

Graphite B is SGL Ash02 characterized as a natural graphite flake product sold by SGL Corporation.

Graphite C is XC-72.SGLV Fine characterized as a natural graphite flake product sold by SGL Corporation.

Graphite D is available from Asbury Graphite in Asbury, N.J. It is a modified version of the 4012 product.

Graphite E is a conductive flake graphite available from Asbury Graphite in Asbury, N.J. under the trade designation 3243. It is characterized by having less than 18% greater than 75 microns and less than 65% smaller than 44 microns in diameter.

Graphite F is a conductive flake graphite available from Asbury Graphite in Asbury, N.J. under the trade designation 230U. It is characterized by having 100% smaller than 44 microns in diameter.

Graphite G is a synthetic graphite available from Asbury Graphite in Asbury, N.J. under the trade designation A99. It is characterized by having less than 3% greater than 44 microns and less than 99% smaller than 44 microns in diameter.

Graphite H is a synthetic graphite available under the designation KS 75, from Timrex America, Inc. It is characterized by having less than 95% greater than 96 microns and less than 95% smaller than 75 microns in diameter.

Graphite I is a synthetic graphite available under the designation KS 150, from Timrex America, Inc. It is characterized by having at least 95% less than 180 microns in diameter.

Graphite J is a synthetic graphite available under the designation KC44, from Timrex America, Inc. It is characterized by having at least 90% less than 48 microns in diameter.

Carbon Black B is characterized as an electrically conductive low residue carbon black having a nitrogen surface area m2/g of 270, a STSA surface Area m2/g of 145 a sieve residue at 35 mesh of 0 ppm and at 325 mesh of 20 ppm as sold under the tradename Conductex 975 by Columbia Chemicals of Jamesburg, N.J.

Carbon Black C is conductive carbon black supplied by Cabot Corporation of Boston, Mass. under the tradename, Black Pearls, while Graphite D is supplied by this company under the designation XC-72.

Carbon Black E is conductive carbon black supplied by Akzo Nobel Chemicals of Chicago, Ill. under the tradename Ketjenblack EC-300 J and EC-600JD. EC-300 J has an iodine absorption of 740–840 mg/g; a pore volume of 310–345 cm3/100 g and an apparent bulk density of 125–145 kg/m3. EC-600 JD has an iodine absorption of 1000–1150 mg/g; a pore volume of 480–510 cm3/100 g and an apparent bulk density of 100–120 kg/m3.

The Glass fibers were from Owens-Corning Fiberglass and are characterized as continuous glass filaments hammermilled into a specific length used as a reinforcing and filler medium.

The inhibitor was 2,6-di-tertbutyl-p-cresol (25% in vinyl toluene).

Low profile additive A is FN-510, a linear low-density polyethylene from Equistar Chemicals, L.P. of Houston, Tex.

Low profile additive B is SGP-70C from Esprit Chemical of Sarasota, Fla. It is characterized as a styrene divinyl benzene copolymer with 0.4 wt % styrene monomer and 0.1 wt % divinyl benzene.

Low profile additive C is R-134 from Premix, Inc of North Kingsville, Ohio. It is characterized as a styrene and thermoplastic solution with 70–80 wt % resin and styrene monomer and 20–30 wt % styrene butadiene styrene and styrene ethylene propylene copolymer.

Low profile additive D is Resin RP-700 from Owens-Corning Fiberglass. It is characterized as a styrene solution of polymethyl methacrylate with 30–35 wt % resin, and styrene.

Low profile additive E is Neulon polyester modifier T-plus from Union Carbide. It is characterized as a polyvinyl acetate/ester epoxide with less than 4 wt % acetate, greater than 5 wt % ester, epoxide, greater than 20 wt % polyvinyl acetate copolymer, and less than 60 wt % styrene.

Low profile additive F is Microthene F from Equistar Chemicals, L.P. of Houston, Tex. It is characterized as a microfine polypropylene powder having an average particle size of 20 microns.

Low profile additive G is Levapren 450 from Bayer Corporation. It is characterized as an ethylene-vinyl acetate copolymer in styrene.

Low profile additive H is XLP-1889 from Union Carbide. It is characterized as an acetic acid ethenyl ester, homopolymer in styrene with 0.5 wt % ketone, 0.5 wt % vinyl acetate, greater than 10 wt % ether ester, less than 34 wt % polyvinyl acetate and greater than 55 wt % styrene.

Low profile additive I is Neulon conductive E from Union Carbide. It is characterized as a carbon black/vinyl resin compound with greater than 70 wt % of carboxyl modified vinyl resin, less than 30 wt % of carbon black, less than 2 wt % vinyl acetate, and less than 1.5 wt % ketone.

Low profile additive J is RCI 31703, (Polylite R) from Reichhold, Inc. It is characterized as a urethane pre-polymer having 75 wt % polymer solids and 25 wt % styrene monomer.

Low profile additive K is PPO MX5587 from GE Plastics Canada, Ltd. It is characterized as a capped PPO resin, which is a modified polyphenylene ether resin.

Low profile additive L is PPO SA120 from GE Plastics Canada, Ltd. It is characterized as a PPO resin which is a polyphenylene ether resin.

The molding compositions are generally prepared by adding the resin, monomer, initiator, inhibitor, mold release agent, and rheological modifier (if present) to a high shear cowels disperser and blending for 2 minutes. The conductive filler is added to the mix in a Baker Perkin, Littleford, or Readco Continuous mixer and mixed 10 to 15 minutes.

When mixing is complete the composition is put in a suitable barrier bag and allowed to mature for approximately one day before molding.

The molding parameters for the molding compositions are as follows:
Molding temperature for plaques was 295° F. with a molding time of 3 minutes and a charge weight of 173 g. The molding temperature for prototype bipolar plates was 290° F. with a molding time of 3 minutes and a charge weight of 300 g. These plates were highly detailed including an elaborate flow maze having about a 10 to 40 thousandth depth and corresponding width as typified in FIG. 1.

It was observed that the use of specific thermosetting resins with a conductive filler in combination with various rheological additives (thickeners) improved the bipolar plate composition in regards to having a product which can be used in mass production of electrochemical, e.g. fuel, cell bipolar plates.

The results of the formulation changes include non-cracking molding compound, better hot strength out of the mold, lower production costs, shorter cycle times, better overall electrical conductivity, increased mechanical properties, and better Theological characteristics.

In Table IA the Control L-23012 provided a compression molded plate, having an intricate flow field design formed therein, useful as a fuel cell plate. However, the plate suffered from cracking during molding and had non-uniform conductivity and resistivity along the surface of the plate due to phase separation of the conductive filler and resin during molding compared with a preferred embodiment described herein in which the molded composition contains a rheological modifier. Samples L-23185, L-23120, L-23119 and L-23126 had desirable properties.

In Table IB Samples L-23125, L-23186, L-23039 had desirable properties. Samples L-23184 and L-23022 had lower than optimal bulk conductivity and higher than optimal resistivity.

In Table IC Samples L-23023, L-23063, L-23024, L-323027, and L-23026 had lower than optimal bulk conductivity and higher than optimal resistivity.

In Table ID Samples L-23209 and L-23215 had good properties. Samples L-23028, L-23210, and L-23211 had lower than optimal bulk conductivity and higher than optimal resistively.

TABLE IA

| Component | Control L-23012 | L-23185 | L-23120 | L-23119 | L-23126 |
|---|---|---|---|---|---|
| Resin A | 30.1 g | | | | |
| Resin B | | | | | |
| Resin C | | | | 19.95 g | |
| Resin D | | 17.13 | 15.63 | | 23.33 |
| Initiator | 0.6 g (A) | 0.4 (B) | 0.4 (B) | 0.4 (B) | 0.4 (B) |
| Inhibitor | 0.1 | 0.1 | 0.1 | 0.1 | 0.1 |
| Mold Release | 1.2 | 1.2 | 1.2 | 1.2 | 1.2 |
| Graphite A | 68 g | 75 | 78 | 78 | |
| Graphite B | | | | | 68 |
| Graphite C | | | | | |
| Thickener A | — | | | 0.35 g | |
| Thickener B | — | 6.17 | 4.67 | | 6.97 |
| Glass fibers | | | | | |
| Bulk Conductivity S/cm | 85 | 85 | 90 | 90 | 70 |
| Areal Conductivity S/cm$^2$ | 300 | 260 | 260 | 260 | 220 |
| Tensile psi | 3500 | 3700 | 3600 | 3100 | 3500 |
| Flexural psi | 4100 | 5500 | 4300 | 3500 | 4200 |
| Resistivity OHMS/M$^2$ | | 70.9 | 87.51 | 71.2 | 37.7 |

TABLE IB

| Component | L-23125 | L-23186 | L-23039 | L-23184 | L-23022 |
|---|---|---|---|---|---|
| Resin A | | | | | |
| Resin B | | | 19.95 | | 29.95 |
| Resin C | | 22.65 | | 27.65 | |
| Resin D | 23.33 g | | | | |
| Initiator | 04 (B) | 0.4 (C) | 0.4 (B) | 0.4 (C) | 0.4 (B) |
| Inhibitor | 0.1 | 0.1 | 0.1 | 0.1 | 0.1 |
| Mold Release | 1.2 | 1.3 | 1.2 | 1.3 | 1.2 |
| Graphite A | 34 | 70 | 68 | 70 | 68 |
| Graphite B | 34 | | | | |
| Graphite C | | | | | |
| Thickener A | | 0.55 | 0.35 | 0.55 | 0.35 |
| Thickener B | 6.97 | | | | |
| Glass fibers | | 5 | 10 | | |
| Bulk Conductivity S/cm | 70 | 70 | 65 | 45 | 40 |
| Areal Conductivity S/cm$^2$ | 210 | 210 | 200 | 140 | 140 |
| Tensile psi | 3400 | 3000 | 2800 | 3000 | 4100 |
| Flexural psi | 4200 | 3700 | 3800 | 4000 | 5000 |
| Resistivity OHMS/M$^2$ | 58.13 | 123.8 | 117.6 | 155.6 | 222.1 |

TABLE IC

| Component | L-23023 | L-23063 | L-23024 | L-23027 | L-23026 |
|---|---|---|---|---|---|
| Resin A | | | | | |
| Resin B | 29.95 | 29.95 | 29.95 | | |
| Resin C | | | | 29.95 | 29.950 |
| Resin D | | | | | |
| Initiator | 0.4 (C) | 0.4 (B) | 0.4 (D) | 0.4 (C) | 0.4 (B) |
| Inhibitor | 0.1 | 0.1 | 0.1 | 0.1 | 0.1 |
| Mold Release | 1.2 | 1.2 | 1.2 | 1.2 | 1.2 |
| Graphite A | 68 | 68 | 68 | 68 | 68 |
| Graphite B | | | | | |
| Graphite C | | | | | |
| Thickener A | 0.35 | 0.35 | 0.35 | 0.35 | 0.35 |
| Thickener B | | | | | |
| Glass fibers | | | | | |
| Bulk Conductivity S/cm | 40 | 40 | 35 | 30 | 30 |
| Areal Conductivity S/cm$^2$ | 140 | 120 | 130 | 90 | 90 |
| Tensile psi | 4200 | 3500 | 3100 | 4700 | 4300 |
| Flexural psi | 4900 | 4200 | 3400 | 6000 | 5300 |
| Resistivity OHMS/M$^2$ | 205.9 | — | 181.7 | 320.9 | 246.8 |

TABLE 1D

| Component | L-23028 | L-23209 | L-23210 | L-23211 | L-23215 |
|---|---|---|---|---|---|
| Resin A | | | | | |
| Resin B | | | | | |
| Resin C | 29.95 | | | 28.65 | 22.65 |
| Resin D | | 21.49 | 21.49 | | |

TABLE 1D-continued

| Component | L-23028 | L-23209 | L-23210 | L-23211 | L-23215 |
|---|---|---|---|---|---|
| Initiator | 0.4 (D) | 0.4(B) | 0.4 (B0 | 0.4 (B) | 0.4 (B) |
| Inhibitor | 0.1 | 0.1 | 0.1 | 0.1 | 0.1 |
| Mold Release | 1.2 | 1.2 | 1.2 | 1.3 | 1.3 |
| Graphite A | 68 | 42 | 42 | 43 | 70 |
| Graphite B | | 26 | | | |
| Graphite C | 0.35 | | 26 | 26 | |
| Thickener A | 0.35 | | | 0.55 | 0.55 |
| Thickener B | | 8.81 | 8.81 | | |
| Glass fibers | | | | | |
| Bulk Conductivity S/cm | 30 | 77 | 25 | 45 | 79 |
| Areal Conductivity S/cm² | 100 | 227 | 74 | 132 | 233 |
| Tensile psi | 3800 | 2700 | 3900 | 3000 | 2600 |
| Flexural psi | 5100 | 3900 | 5500 | 4500 | 4300 |
| Resistivity OHMS/M² | 220.9 | 62.02 | 377.8 | 186.46 | 102.74 |

TABLE 2A

| Component | 23012 | 23039 | 23022 | 23023 | 23063 |
|---|---|---|---|---|---|
| Resin A | 100 | | | | |
| Resin B | | 100 | 100 | 100 | 100 |
| Initiator A | 1.99 | | | | |
| Initiator B | | 2.01 | 1.34 | | 1.34 |
| Inhibitor | | | | 1.34 | |
| Release Agent | 3.99 | 6.02 | 4.01 | 4.01 | 4.01 |
| Graphite A | 225.91 | | | 227.05 | |
| | | 340.85 | 227.05 | | 227.05 |
| Modifier A | | | 1.17 | 1.17 | 1.17 |
| Fiber A | | 50.13 | | | |
| Bulk Conductivity S/cm | 85 | 65 | 40 | 40 | 40 |
| Areal Conductivity S/cm² | 300 | 200 | 140 | 140 | 120 |
| Tensile psi | 3500 | 2800 | 4100 | 4200 | 3500 |
| Flexural psi | 4100 | 3800 | 5000 | 4900 | 4200 |

TABLE 2B

| Component | 23024 | 23119 | 23186 | 23184 | 23027 |
|---|---|---|---|---|---|
| Resin B | 100 | | | | |
| Resin C | | 100 | 100 | 100 | 100 |
| Initiator B | | 2.01 | | | |
| Initiator C | | | 1.77 | 1.45 | 1.34 |
| Initiator D | 1.34 | | | | |
| Inhibitor | 0.33 | 0.50 | 0.44 | 0.36 | 0.33 |
| Release Agent | 4.01 | 6.02 | 5.74 | 4.70 | 4.01 |
| Graphite A | 227.05 | 390.98 | 309.05 | 253.16 | 227.05 |
| Modifier A | 1.17 | 1.75 | 2.43 | 1.99 | 1.17 |
| Fibers A | | | | | |
| Bulk Conductivity S/cm | | 22.08 | | | |
| Areal Conductivity S/cm² | 35 | 90 | 70 | 45 | 30 |
| Tensile psi | 135 | 260 | 210 | 140 | 90 |
| Flexural psi | 3100 | 3100 | 3000 | 3000 | 4700 |

TABLE 2C

| Component | 23026 | 23028 | 23211 | 23215 | 23185 |
|---|---|---|---|---|---|
| Resin C | 100 | 100 | 100 | 100 | |
| Resin D | | | | | 100 |
| Initiator B | 1.34 | | 1.40 | 1.77 | 2.34 |
| Initiator D | | 1.34 | | | |
| Inhibitor | 0.33 | 0.33 | 0.35 | 0.44 | 0.58 |
| Release Agent | 4.01 | 4.01 | 4.54 | 5.74 | 7.01 |
| Graphite A | 227.05 | 227.05 | 150.09 | 309.05 | 437.83 |
| Graphite C | | | 90.75 | | |
| Modifier A | 1.17 | 1.17 | 1.92 | 2.43 | |
| Modifier B | | | | | 36.02 |
| Fiber B | | | | 22.08 | |
| Bulk Conductivity S/cm | 30 | 30 | 45 | 79 | 85 |
| Areal Conductivity S/cm² | 90 | 100 | 132 | 233 | 260 |
| Tensile psi | 4300 | 3800 | 3000 | 2600 | 3700 |
| Flexural psi | 5300 | 5100 | 4500 | 4300 | 5500 |

TABLE 2D

| Component | 23120 | 23126 | 23125 | 23209 | 23210 |
|---|---|---|---|---|---|
| Resin D | 100 | 100 | 100 | 100 | 100 |
| Initiator A | 2.56 | 1.71 | 1.71 | 1.86 | 1.86 |
| Inhibitor | 0.64 | 0.43 | 0.43 | 0.43 | 0.47 |
| Release Agent | 7.68 | 5.14 | 5.14 | 5.58 | 5.58 |
| Graphite A | 499.04 | | 145.74 | 195.44 | 195.44 |
| Graphite B | | 291.47 | 145.74 | 20.99 | |
| Graphite C | | | | | 120.99 |
| Modifier B | 29.88 | 29.88 | 29.88 | 41.00 | 41.00 |
| Bulk Conductivity S/cm | 90 | 70 | 70 | 77 | 25 |
| Areal Conductivity S/cm² | 260 | 220 | 210 | 227 | 74 |
| Tensile psi | 3600 | 3500 | 3400 | 2700 | 3900 |
| Flexural psi | 4300 | 4200 | 4200 | 3900 | 5500 |

TABLE 3A

| Component | 23227 | 23236 | 23274 | 23275 | 23293 |
|---|---|---|---|---|---|
| Resin D | 100 | 100 | 100 | 100 | 100 |
| Initiator B | 1.56 | 1.44 | 1.51 | 2.34 | 2.34 |
| Inhibitor | 0.52 | 0.48 | 0.50 | 0.58 | 0.58 |
| Release Agent | 6.24 | 5.77 | 6.06 | 7.01 | 7.01 |
| Graphite A | 390.02 | 350.96 | 68.50 | 420.32 | 420.32 |
| Carbon A | | | | 17.51 | |
| Modifier B | 21.68 | 22.12 | 28.22 | 36.02 | 36.02 |
| Fiber C | | | | | 11.68 |
| Bulk Conductivity S/cm | 90 | | | | |
| Tensile psi | 2672 | | | | |
| Flexural psi | 6543 | | | | |

TABLE 3B

| Component | 23292 | 23293 | 23343 | 23344 | 23345 |
|---|---|---|---|---|---|
| Resin D | 100 | 100 | 100 | 100 | 100 |
| Initiator B | 1.48 | 1.56 | 1.44 | 1.29 | 1.20 |
| Inhibitor | 0.49 | 0.52 | 0.48 | 0.43 | 0.40 |
| Release | 5.93 | 6.24 | 5.75 | 5.14 | 4.80 |

TABLE 3B-continued

| Component | 23292 | 23293 | 23343 | 23344 | 23345 |
|---|---|---|---|---|---|
| Agent | | | | | |
| Graphite A | 370.74 | 395.22 | 349.78 | 299.91 | 72.22 |
| Modifier B | 15.67 | 16.48 | 21.71 | 21.68 | 21.70 |
| Bulk Conductivity S/cm | | | | 72.5 | 58 |
| Tensile psi | | 2170 | 2547 | 2448 | 2679 |
| Flexural psi | | 4616 | 6503 | 5423 | 5897 |

TABLE 3C

| Component | 23346 | 23347 | 23348 | 23349 | 23350 |
|---|---|---|---|---|---|
| Resin D | 100 | 100 | 100 | 100 | 100 |
| Initiator B | 1.09 | 1.02 | 0.95 | 0.90 | 0.84 |
| Inhibitor | 0.36 | 0.34 | 0.32 | 0.30 | 0.28 |
| Release Agent | 4.37 | 4.23 | 3.80 | 3.61 | 3.36 |
| Graphite A | 236.79 | 216.57 | 90.11 | 174.70 | 154.19 |
| Modifier B | 21.68 | 21.69 | 21.67 | 21.69 | 21.67 |
| Tensile psi | 3083 | 3053 | 2923 | 3107 | 3470 |
| Flexural psi | 5715 | 5766 | 5666 | 5398 | 5378 |

TABLE 3D

| Component | 23335 | 23352 | 23360 | 23361 | 23362 |
|---|---|---|---|---|---|
| Resin D | 100 | 100 | 100 | 100 | 100 |
| Initiator B | 0.80 | 0.75 | 2.27 | 2.21 | 2.14 |
| Inhibitor | 0.27 | 0.25 | 0.57 | 0.55 | 0.54 |
| Release Agent | 3.22 | 3.02 | 6.81 | 6.62 | 6.43 |
| Graphite A | 142.05 | 125.75 | 425.41 | 413.45 | 02.14 |
| Modifier B | 21.68 | 21.73 | 32.16 | 28.45 | 24.93 |
| Bulk Conductivity S/cm | | | | | 85.5 |
| Tensile psi | 2787 | 2629 | | | 2155 |
| Flexural psi | 6167 | 5998 | | | 6017 |

TABLE 4A

| Component | 23364 | 23365 | 23366 | 23367 | 23368 |
|---|---|---|---|---|---|
| Resin D | 100 | 100 | 100 | 100 | 100 |
| Monomer A | 9.72 | 8.18 | 7.05 | 6.20 | 5.53 |
| Initiator B | 1.46 | 1.23 | 1.06 | 0.93 | 0.83 |
| Inhibitor | 0.49 | 0.41 | 0.35 | 0.31 | 0.28 |
| Release Agent | 5.83 | 4.91 | 4.23 | 3.72 | 3.32 |
| Graphite A | 340.30 | 265.85 | 211.57 | 170.54 | 138.31 |
| Modifier B | 28.43 | 28.34 | 28.35 | 28.37 | 28.35 |
| Bulk Conductivity S/cm | 55.99 | 36.57 | 32.86 | 18.37 | 13.59 |
| Tensile psi | 2647 | 2697 | 2701 | 2880 | 2992 |
| Flexural psi | 6044 | 6131 | 6149 | 7002 | 7338 |
| Density g/cm3 | 1.75 | 1.74 | 1.71 | 1.72 | 1.71 |
| Shrink mils/in | -2.5 | -2.83 | -3.17 | -3.33 | -3.83 |

TABLE 4B

| Component | 23369 | 23370 | 23371 | 23372 | 23373 |
|---|---|---|---|---|---|
| Resin D | 100 | 100 | 100 | 100 | 100 |
| Initiator B | 1.36 | 1.15 | 1.00 | 0.89 | 0.79 |
| Release | 5.42 | 4.61 | 4.01 | 3.55 | 3.18 |

TABLE 4B-continued

| Component | 23369 | 23370 | 23371 | 23372 | 23373 |
|---|---|---|---|---|---|
| Agent | | | | | |
| Graphite A | 316.17 | 249.52 | 200.33 | 162.48 | 132.45 |
| Modifier B | 28.27 | 28.21 | 28.21 | 28.21 | 28.21 |
| Bulk Conductivity S/cm | 49.49 | 27.74 | 25.05 | 14.01 | 8.12 |
| Tensile psi | 2974 | 3358 | 3014 | 2952 | 3154 |
| Flexural psi | 6394 | 6099 | 6520 | 6312 | 6071 |
| Density g/cm3 | 1.72 | 1.76 | 1.69 | 1.73 | 1.72 |
| Shrink mils/in | -3.5 | -2.5 | -2.83 | -3.17 | -3.53 |

TABLE 4C

| Component | 23443 | 23444 | 23445 | 23466 | 23467 |
|---|---|---|---|---|---|
| Resin D | 100 | 100 | 100 | 100 | 100 |
| Initiator B | 1.84 | 1.72 | 1.56 | 1.81 | 1.54 |
| Inhibitor | 0.46 | 0.43 | 0.39 | 0.45 | 0.39 |
| Release Agent | 5.52 | 5.15 | 4.69 | 5.44 | 4.62 |
| Graphite A | 32.14 | 291.85 | 253.91 | 317.17 | 250.29 |
| Modifier B | 30.23 | 30.04 | 30.08 | 28.23 | 28.23 |
| Bulk Conductivity S/cm | 36 | 21.2 | 15 | 39 | 21 |
| Tensile psi | | | | 2312 | 2765 |
| Flexural psi | | | | 6154 | 5994 |
| Density g/cm3 | 1.76 | 1.76 | 1.75 | 1.75 | 1.73 |
| Shrink mils/in | -2 | -2 | -2.33 | -1.67 | -1.83 |

TABLE 4D

| Component | 23468 | 23469 | 23470 | 23471 | 23472 |
|---|---|---|---|---|---|
| Resin D | 100 | 100 | 100 | 100 | 100 |
| Initiator B | 1.69 | 1.75 | 1.95 | 2.11 | 1.46 |
| Inhibitor | 0.42 | 0.44 | 0.49 | 0.53 | 0.37 |
| Release Agent | 5.52 | 5.15 | 4.69 | 5.44 | 4.62 |
| Graphite A | 287.77 | 284.46 | 331.55 | 369.39 | 241.01 |
| Modifier B | 28.23 | 28.23 | 28.23 | 28.23 | 23.47 |
| Fiber D | | 17.51 | 19.50 | 21.11 | |
| Bulk Conductivity S/cm | 34 | | 45 | 60 | 61 |
| Tensile psi | 2466 | 2804 | 1797 | 2010 | 2821 |
| Flexural psi | 5272 | 7390 | 6682 | 4726 | 4898 |
| Density g/cm3 | 1.71 | 1.6 | 1.62 | 1.58 | 1.75 |
| Shrink mils/in | -2.33 | -2 | -1.42 | -1.67 | -2.5 |

TABLE 5A

| Component | 23506 | 23507 | 23508 | 23509 | 23510 |
|---|---|---|---|---|---|
| Resin D | 100 | 100 | 100 | 100 | 100 |
| Initiator B | 1.63 | 1.75 | 1.45 | 1.59 | 1.70 |
| Inhibitor | 0.41 | 0.44 | 0.36 | 0.40 | 0.43 |
| Release Agent | 4.89 | 5.24 | 4.34 | 4.77 | 5.11 |
| Graphite A | 277.10 | 305.41 | 235.17 | 270.38 | 298.00 |
| Modifier B | 23.47 | 23.47 | 20.48 | 20.48 | 20.48 |
| Bulk Conductivity S/cm | 55 | 45 | 52 | 60 | 65 |
| Tensile psi | 2680 | 2645 | | | 2483 |
| Flexural psi | 4556.7 | 5264.4 | | | |
| | | | | | 4773.67 |

TABLE 5A-continued

| Component | 23506 | 23507 | 23508 | 23509 | 23510 |
|---|---|---|---|---|---|
| Density g/cm3 | 1.74 | 1.74 | 1.79 | 1.78 | 1.76 |
| Shrink mils/in | −2.5 | −2.33 | −2.33 | −2.42 | −1.75 |

TABLE 5B

| Component | 23566 | 23567 | 23568 | 23581 | 23582 |
|---|---|---|---|---|---|
| Resin D | 100 | 100 | 100 | 100 | 100 |
| Initiator B | 1.85 | 1.79 | 1.75 | 1.77 | 1.83 |
| Inhibitor | 0.46 | 0.45 | 0.44 | 0.44 | 0.46 |
| Release Agent | 5.54 | 5.38 | 5.26 | 5.30 | 5.50 |
| Graphite A | 346.42 | 336.32 | 328.95 | 313.33 | 329.820 |
| Modifier B |  |  |  | 20.48 | 20.48 |
| Modifier D | 7.62 | 4.48 | 2.19 |  |  |
| Bulk Conductivity S/cm |  | 92 | 94 |  |  |
| Density g/cm3 | 1.77 | 1.78 | 1.75 | 1.79 | 1.76 |
| Shrink mils/in | −1.67 | −1.25 | −1.25 | −1.67 | −1.58 |

TABLE 5C

| Component | 23583 | 23584 | 23585 | 23592 | 23593 |
|---|---|---|---|---|---|
| Resin D | 100 | 100 | 100 | 100 | 100 |
| Initiator B | 1.90 | 1.98 | 2.07 | 1.88 | 1.97 |
| Inhibitor | 0.48 | 0.50 | 0.52 | 0.47 | 0.49 |
| Release Agent | 5.71 | 5.95 | 6.20 | 5.63 | 5.91 |
| Graphite A | 347.62 | 366.88 | 387.80 | 352.11 | 369.46 |
| Modifier B | 20.48 | 20.48 | 20.48 |  |  |
| Modifier D |  |  |  | 9.39 | 14.78 |
| Bulk Conductivity S/cm |  |  |  | 88 | 59 |
| Density g/cm3 | 1.78 | 1.75 | 1.71 | 1.71 | 1.71 |
| Shrink mils/in | −1.5 | −1.25 | −1.25 | −1.67 | −1.67 |

TABLE 5D

| Component | 23594 | 23721 | 23722 | 23723 | 23724 |
|---|---|---|---|---|---|
| Resin D | 100 | 100 | 100 | 100 | 100 |
| Initiator B | 2.07 | 2.19 | 2.24 | 1.94 | 2.00 |
| Inhibitor | 0.52 | 0.55 | 0.56 | 0.48 | 0.50 |
| Release Agent | 6.22 | 6.57 | 6.71 | 5.82 | 6.00 |
| Graphite A | 347.62 | 366.88 | 387.80 | 352.11 | 369.46 |
| Modifier B |  | 27.53 | 30.24 | 22.70 | 26.56 |
| Modifier D | 20.73 |  |  |  |  |
| Bulk Conductivity S/cm |  | 86 | 93 | 68 | 65 |
| Density g/cm3 | 1.71 | 1.74 | 1.77 | 1.77 | 1.78 |
| Shrink mils/in | −1.25 | −1.42 | −1.08 | −1.5 | −1.25 |

TABLE 6A

| Component | 23725 | 23726 | 23727 | 23728 | 23729 |
|---|---|---|---|---|---|
| Resin D | 100 | 100 | 100 | 100 | 100 |
| Initiator B | 2.14 | 1.90 | 2.14 | 1.90 | 2.14 |
| Inhibitor | 0.54 | 0.48 | 0.54 | 0.48 | 0.54 |

TABLE 6A-continued

| Component | 23725 | 23726 | 23727 | 23728 | 23729 |
|---|---|---|---|---|---|
| Release Agent | 6.43 | 5.71 | 6.43 | 5.71 | 6.43 |
| Graphite D | 402.14 | 347.62 |  |  |  |
| Graphite E |  |  | 402.14 | 347.62 |  |
| Graphite F |  |  |  |  | 402.14 |
| Modifier B | 24.93 |  |  | 20.48 | 24.93 |
| Modifier D |  | 20.48 | 24.93 |  |  |
| Bulk Conductivity S/cm | 96 | 75 | 81 | 62 |  |
| Density g/cm3 | 1.77 | 1.78 | 1.77 | 1.81 | 1.8 |
| Shrink mils/in | −1.67 | −2.33 | −0.83 | −1.5 | −1. |

TABLE 6B

| Component | 23730 | 23731 | 23732 | 23733 | 23734 |
|---|---|---|---|---|---|
| Resin D | 100 | 100 | 100 | 100 | 100 |
| Initiator B | 1.90 | 2.14 | 1.90 | 2.14 | 2.14 |
| Inhibitor | 0.48 | 0.54 | 0.48 | 0.54 | 0.54 |
| Release Agent | 5.71 | 6.43 | 5.71 | 6.43 | 6.43 |
| Graphite A |  |  |  | 249.33 | 249.33 |
| Graphite E |  |  |  | 152.82 |  |
| Graphite F | 347.62 |  |  |  | 152.82 |
| Graphite G |  | 402.14 | 347.62 |  |  |
| Modifier B | 20.48 | 24.93 | 20.48 | 24.93 | 24.93 |
| Bulk Conductivity S/cm |  | 32 | 30 | 48 | 25 |
| Density g/cm3 |  |  |  | 1.81 | 1.81 |
| Shrink mils/in |  |  |  | −1.33 | −1.83 |

TABLE 6C

| Component | 23735 | 23736 | 23737 | 23738 | 23739 |
|---|---|---|---|---|---|
| Resin D | 100 | 100 | 100 | 100 | 100 |
| Initiator B | 2.14 | 2.14 | 1.90 | 1.90 | 1.90 |
| Inhibitor | 054 | 0.54 | 0.48 | 0.48 | 0.48 |
| Release Agent | 6.43 | 6.43 | 5.71 | 5.71 | 5.71 |
| Graphite A | 249.33 | 249.33 | 215.52 | 215.52 | 215.52 |
| Graphite D |  | 152.82 |  |  |  |
| Graphite E |  |  | 132.10 |  |  |
| Graphite F | 347.62 |  |  | 132.10 |  |
| Graphite G | 152.82 |  |  |  | 132.10 |
| Modifier B | 24.93 | 24.93 | 20.48 | 20.48 | 20.48 |
| Bulk Conductivity S/cm | 38 | 90 | 50 | 26 | 31 |
| Density g/cm3 | 1.79 | 1.67 | 1.79 | 1.8 | 1.8 |
| Shrink mils/in | −2.08 | −1.58 | −1.83 | −2.33 | −2.67 |

TABLE 6D

| Component | 23740 | 23755 | 23756 | 23757 | 23758 |
|---|---|---|---|---|---|
| Resin D | 100 | 100 | 100 | 100 | 100 |
| Initiator B | 1.90 | 2.17 | 2.20 | 1.93 | 1.95 |
| Inhibitor | 0.48 | 0.54 | 0.55 | 0.48 | 0.49 |
| Release Agent | 5.71 | 6.52 | 6.61 | 5.78 | 5.85 |
| Graphite A | 215.52 | 407.61 | 413.22 | 341.81 | 356.10 |
| Graphite D | 132.10 |  |  |  |  |
| Modifier B | 20.48 | 23.91 | 22.87 | 19.52 | 18.54 |
| Modifier D |  | 2.72 | 5.51 | 2.41 | 4.88 |

TABLE 6D-continued

| Component | 23740 | 23755 | 23756 | 23757 | 23758 |
|---|---|---|---|---|---|
| Bulk Conductivity S/cm | 68 | 70 | 97 | 92 | 89 |
| Density g/cm3 | 1.75 | 1.67 | 1.79 | 1.8 | 1.8 |
| Shrink mils/in | −2.08 | −1.58 | −1.83 | −2.33 | −2.67 |

TABLE 7A

| Component | 23803 | 23804 | 23805 | 23806 | 23830 |
|---|---|---|---|---|---|
| Resin D | 100 | 100 | 100 | 100 | 100 |
| Initiator B | 2.06 | 2.09 | 2.18 | 2.19 | 2.16 |
| Inhibitor | 0.52 | 0.52 | 0.54 | 0.55 | 0.54 |
| Release Agent | 6.19 | 6.27 | 6.49 | 6.58 | 6.49 |
| Graphite A | 376.29 | 381.20 | 394.59 | 405.48 | 394.59 |
| Modifier B | 25.26 | 25.59 | 25.59 | 26.30 | 30.00 |
| Modifier E | 5.15 | 6.53 | 10.81 | 6.85 | 6.76 |
| Bulk Conductivity S/cm | 62 | 83 | 83 | 90 | |

TABLE 7B

| Component | 23831 | 23832 | 23833 | 23834 | 23835 |
|---|---|---|---|---|---|
| Resin D | 100 | 100 | 100 | 100 | 100 |
| Initiator B | 2.11 | 2.16 | 2.23 | 2.09 | 2.09 |
| Inhibitor | 0.53 | 0.54 | 0.56 | 0.52 | 0.52 |
| Release Agent | 6.33 | 6.54 | 6.69 | 6.27 | 6.27 |
| Graphite A | 385.22 | 397.82 | 406.69 | | |
| Graphite H | | | | 381.20 | |
| Graphite I | | | | | 381.20 |
| Modifier B | 25.59 | 25.61 | 25.63 | 25.59 | 25.59 |
| Modifier E | | 6.81 | 6.96 | 6.53 | 6.53 |

TABLE 7C

| Component | 23836 | 23837 | 23838 | 23839 | 23840 |
|---|---|---|---|---|---|
| Resin D | 100 | 100 | 100 | 100 | 100 |
| Initiator B | 2.09 | 2.24 | 2.24 | 2.24 | 2.24 |
| Inhibitor | 0.52 | 0.56 | 0.56 | 0.56 | 0.56 |
| Release Agent | 6.27 | 6.71 | 6.71 | 6.71 | 6.71 |
| Graphite A | | 408.28 | 408.28 | 408.28 | 408.28 |
| Graphite J | 381.20 | | | | |
| Carbon B | | 0.56 | | | |
| Carbon C | | | 0.56 | | |
| Carbon D | | | | 0.56 | |
| Carbon E | | | | | 0.56 |
| Modifier B | 25.59 | 25.56 | 25.56 | 25.56 | 25.56 |
| Modifier E | 6.53 | 6.99 | 6.99 | 6.99 | 6.99 |
| Modifier F | | 8.39 | 8.39 | 8.39 | 8.39 |

TABLE 7D

| Component | 23878 | 23879 | 23880 | 23881 | 23896 |
|---|---|---|---|---|---|
| Resin D | 100 | 100 | 100 | 100 | 100 |
| Initiator B | 2.26 | 2.37 | 2.28 | 2.39 | 1.48 |
| Inhibitor | 0.57 | 0.59 | 0.57 | 0.60 | 0.49 |
| Release Agent | 6.79 | 7.11 | 6.83 | 7.16 | 5.93 |
| Graphite A | 418.55 | 444.31 | 421.41 | 447.49 | 370.74 |
| Modifier B | 25.57 | 25.59 | 25.57 | 25.60 | 5.68 |

TABLE 7D-continued

| Component | 23878 | 23879 | 23880 | 23881 | 23896 |
|---|---|---|---|---|---|
| Modifier C | | | | | 9.99 |
| Modifier E | | | 7.12 | 7.46 | |
| Modifier F | 11.88 | 12.44 | 5.69 | 5.97 | |

TABLE 8A

| Component | 23297 | 23301 | 23302 | 23363 | 23422 |
|---|---|---|---|---|---|
| Resin E | 100 | 100 | 100 | 100 | 100 |
| Initiator B | 1.56 | 1.38 | 1.33 | 1.06 | 1.75 |
| Inhibitor | 0.52 | 0.46 | 0.44 | 0.35 | 0.58 |
| Release Agent | 6.24 | 5.50 | 5.31 | 4.24 | 7.00 |
| Graphite A | 395.22 | 343.88 | 331.86 | 240.03 | 466.74 |
| Modifier B | 5.98 | 2.66 | 1.28 | 2.65 | 2.68 |
| Modifier C | 10.50 | 4.63 | 2.26 | 4.66 | 4.67 |
| Bulk Conductivity S/cm | | 72.5 | | 35 | |
| Density g/cm3 | | 1.62 | | 1.53 | 1.6 |
| Shrink mils/in | | −2.33 | | −1.33 | −0.92 |

TABLE 8B

| Component | 23423 | 23452 | 23453 | 23454 | 23455 |
|---|---|---|---|---|---|
| Resin D | | 50.03 | 60.00 | 70.03 | 80.00 |
| Resin E | 100 | | | | |
| Resin F | | 49.97 | 40.00 | 29.97 | 20.00 |
| Initiator B | 2.40 | 2.14 | 2.14 | 2.14 | 2.14 |
| Inhibitor | 0.80 | 0.54 | 0.54 | 0.54 | 0.54 |
| Release Agent | 9.61 | 6.43 | 6.43 | 6.43 | 6.43 |
| Graphite A | 680.54 | 402.14 | 402.14 | 402.14 | 402.14 |
| Modifier B | 2.64 | 24.93 | 24.93 | 24.93 | 24.93 |
| Modifier C | 4.64 | | | | |
| Bulk Conductivity S/cm | | 63 | 70.5 | 70 | 83.5 |
| Tensile psi | | 2441 | 2497 | 2404 | 2561 |
| Flexural psi | | 5030 | 5126 | 4284 | 5391 |
| Density g/cm3 | 1.47 | 1.71 | 1.74 | 1.75 | 1.66 |
| Shrink mils/in | −0.25 | −1.17 | −1.58 | −1.67 | −1.42 |

TABLE 8C

| Component | 23530 | 23531 | 23646 | 23647 | 23648 |
|---|---|---|---|---|---|
| Resin F | 100 | 100 | | | |
| Resin G | | | 100 | 100 | 100 |
| Initiator B | 1.85 | 1.79 | 1.81 | 1.91 | 2.02 |
| Inhibitor | 0.46 | 0.45 | 0.45 | 0.48 | 0.50 |
| Release Agent | 5.54 | 5.38 | 5.42 | 5.72 | 6.06 |
| Graphite A | 346.42 | 336.32 | 338.75 | 357.65 | 378.60 |
| Modifier B | | | 5.24 | 11.11 | 17.62 |
| Modifier D | 7.62 | 4.48 | | | |
| Bulk Conductivity S/cm | | | 86 | 58 | 46 |
| Tensile psi | 2305.56 | | | | |
| | | 2155.56 | | | |
| Flexural psi | 4548.8 | 4421.3 | | | |
| Density g/cm3 | 1.69 | 1.75 | 1.71 | 1.72 | 1.65 |
| Shrink mils/in | −0.42 | −1.67 | −1.58 | −1.42 | −1.33 |

TABLE 8D

| Component | 23649 | 23650 | 23651 | 23688 |
|---|---|---|---|---|
| Resin I | 100 | 100 | 100 | |
| Resin J | | | | 100 |
| Initiator B | 1.75 | 1.77 | 1.79 | |
| Initiator D | | | | 2.08 |
| Inhibitor | 0.44 | 0.44 | 0.45 | 0.52 |
| Release Agent | 5.26 | 5.31 | 5.38 | 6.25 |
| Graphite A | 328.95 | 331.86 | 336.32 | 385.42 |
| Modifier B | | | | 15.63 |
| Modifier D | 2.19 | | 4.48 | |
| | | 3.10 | | |
| Bulk Conductivity S/cm | 93 | 79 | 64 | |
| Density g/cm3 | 1.77 | 1.74 | 1.73 | |
| Shrink mils/in | −1.5 | −1.08 | −1.5 | |

TABLE 9A

| Component | 24004 | 24005 | 24006 | 24007 | 24008 |
|---|---|---|---|---|---|
| Resin D | 100 | 85.12 | 80.15 | 50.02 | 50.02 |
| Resin K | | | | 49.98 | |
| Resin L | | | | | 49.98 |
| Initiator B | 1.11 | 1 | 0.99 | 0.99 | 0.98 |
| Inhibitor | 0.56 | 0.5 | 0.49 | 0.49 | 0.49 |
| Release Agent A | 6.69 | 5.97 | 5.93 | 5.93 | 5.93 |
| Graphite A | 412.26 | 368.16 | 365.43 | 365.43 | 365.43 |
| Modifier B | 18.38 | 15.67 | 14.81 | 14.81 | 14.81 |
| Low Profile A | 6.96 | 6.21 | 6.17 | 6.17 | 6.17 |
| Low Profile B | 11.14 | | | | |
| Low Profile C | | 14.86 | | | |
| Low Profile D | | | 19.85 | | |
| Shrink mils/in | −1 | −0.65 | −0.45 | −1.1 | −1.03 |

TABLE 9B

| Component | 24009 | 24010 | 24011 | 24012 | 24052 |
|---|---|---|---|---|---|
| Resin D | | | 84.99 | 89.98 | |
| Resin K | | 100 | | | |
| Resin L | 100 | | | | 100 |
| Initiator B | 0.92 | 0.92 | 0.99 | 0.99 | 0.91 |
| Inhibitor | 0.46 | 0.46 | 0.49 | 0.49 | 0.46 |
| Release Agent A | 5.53 | 5.53 | 5.93 | | 5.48 |
| Graphite A | 345.62 | 345.62 | 365.43 | 365.43 | 342.47 |
| Modifier A | 2.53 | 2.53 | | | 1.6 |
| Modifier B | | | 14.81 | 14.81 | |
| Low Profile A | 5.76 | 5.76 | 6.17 | 6.17 | 5.71 |
| Low Profile C | | 14.86 | | | |
| Low Profile D | | | 15.01 | 10.02 | |
| Shrink mils/in | 0.34 | −0.21 | −1.3 | −0.89 | 0.02 |

TABLE 9C

| Component | 24053 | 24054 | 24055 | 24056 |
|---|---|---|---|---|
| Resin K | | | 100 | 100 |
| Resin L | 100 | 100 | | |
| Initiator B | 0.91 | 0.9 | 0.91 | 0.91 |
| Inhibitor | 0.45 | 0.45 | 0.46 | 0.45 |
| Release Agent A | 5.45 | 5.43 | 5.48 | 5.45 |
| Graphite A | 340.91 | 339.37 | 342.46 | 340.91 |
| Modifier B | 1.14 | 0.68 | 1.6 | 1.14 |
| Low Profile A | 5.68 | 5.66 | 5.71 | 5.68 |
| Shrink mils/in | −0.02 | 0.21 | −0.24 | −0.21 |

TABLE 10A

| Component | 24141 | 24142 | 24149 | 24159 | 24160 |
|---|---|---|---|---|---|
| Resin K | 100 | 100 | 100 | | |
| Resin Q | | | | 80 | 70 |
| Initiator B | 0.92 | | 0.93 | 0.93 | 0.93 |
| Initiator D | | 0.55 | | | |
| Inhibitor | 0.46 | 0.46 | 0.47 | 0.47 | 0.47 |
| Release Agent A | 2.97 | 2.96 | 3.96 | 3.96 | 3.96 |
| Release Agent B | 2.97 | 2.96 | 3.96 | 3.96 | 3.96 |
| Graphite A | 343.25 | 342 | 349.65 | 349.65 | 349.65 |
| Modifier A | 1.37 | 1.37 | 1.4 | 1.4 | 0.93 |
| Low Profile A | 5.72 | 5.7 | 5.83 | 5.82 | 5.82 |
| Low Profile E | | | | 20 | 29.98 |
| Shrink mils/in | −0.89 | −1.58 | −0.72 | −0.26 | 0.03 |

TABLE 10B

| Component | 24161 | 24194 | 24195 | 24196 | 24197 |
|---|---|---|---|---|---|
| Resin D | | 100 | | 100 | |
| Resin K | | | | | |
| Resin Q | 60 | | 70 | | 70.29 |
| Initiator B | 0.93 | 1.03 | 0.93 | 0.93 | 0.93 |
| Inhibitor | 0.47 | 0.47 | 0.47 | 0.47 | 3.14 |
| Release Agent A | 3.96 | 7.3 | 3.96 | 3.96 | 3.98 |
| Release Agent B | 3.96 | | 3.96 | 3.96 | 3.98 |
| Graphite A | 349.65 | 450.4 | 349.65 | 349.65 | 350.96 |
| Modifier A | 1.4 | | 1.4 | 1.4 | 1.78 |
| Low Profile A | 5.83 | | | | 5.85 |
| Low Profile E | 40 | 30.43 | 29.98 | | 29.71 |
| Low Profile F | 3.96 | 7.3 | 5.83 | 5.83 | |
| Shrink mils/in | −0.89 | −1.58 | 0.18 | −0.45 | 0.07 |

TABLE 10 C

| Component | 24249 | 24250 | 24261 | 24262 | 24287 |
|---|---|---|---|---|---|
| Resin D | | | 70 | 68.83 | 61.53 |
| Resin K | 88.3 | | | | |
| Resin Q | | 64.44 | | | |
| Monomer B | 11.7 | 11.7 | 12.5 | 12.99 | 12.79 |
| Initiator B | 0.93 | 0.94 | 1 | 1.04 | 1.02 |
| Inhibitor | 0.47 | 0.47 | 0.5 | 0.52 | 0.51 |
| Release Agent A | 3.98 | | 6 | 6.23 | 6.3 |
| Release Agent B | 3.98 | | | | |
| Graphite A | 350.96 | 350.96 | 370 | 384.42 | 378.52 |
| Modifier B | 1.78 | | 16.25 | 20.78 | |
| Low Profile A | 5.84 | 5.85 | 6.26 | 6.49 | |
| Low Profile E | | 23.86 | 17.5 | 18.18 | 25.68 |
| Shrink mils/in | −0.86 | −0.55 | −0.93 | −0.83 | −0.79 |

TABLE 10 D

| Component | 24288 | 24317 | 24318 | 24319 | 24320 |
|---|---|---|---|---|---|
| Resin D | 53.84 | 60.53 | 52.47 | 59.04 | 100 |
| Monomer B | 12.54 | 14.66 | 14.37 | 17.18 | 32.72 |

TABLE 10 D-continued

| Component | 24288 | 24317 | 24318 | 24319 | 24320 |
|---|---|---|---|---|---|
| Initiator B | 1 | 1.17 | 1.15 | 1.37 | 2.62 |
| Inhibitor | 0.5 | 0.59 | 0.57 | 0.69 | 1.31 |
| Release Agent A | 6.02 | 7.04 | 6.9 | 8.25 | 15.71 |
| Graphite A | 371.3 | 451.61 | 442.53 | 549.83 | 1047.12 |
| Modifier B | 16.66 | 18.77 | 16.38 | 18.56 | 30.76 |
| Low Profile A | 6.27 | 7.33 | 7.18 | 8.59 | 16.36 |
| Low Profile E | 33.62 | 24.81 | 33.16 | 23.78 | 62.3 |
| Shrink mils/in | −0.73 | −0.34 | 0 | 0.14 | −0.52 |

TABLE 11A

| Component | 24364 | 24365 | 24495 | 24496 | 24497 |
|---|---|---|---|---|---|
| Resin D | 60.53 | 52.47 | | | |
| Resin N | | | 60.93 | 52.19 | 60.93 |
| Monomer B | 14.66 | 14.37 | 13.01 | 13 | 13 |
| Initiator B | 1.17 | 1.15 | | | |
| Initiator D | | | 0.57 | 0.57 | 0.57 |
| Inhibitor | 0.59 | 0.57 | 0.52 | 0.52 | 0.52 |
| Release Agent A | 7.04 | 6.9 | 6.24 | 6.24 | 6.24 |
| Graphite A | 451.61 | 442.53 | 400.62 | 400.62 | 400.62 |
| Modifier B | 18.77 | 16.38 | | | 5.83 |
| Modifier D | | | 5.83 | 5.83 | |
| Low Profile A | 7.33 | 7.18 | 6.5 | 6.5 | 6.5 |
| Low Profile E | | | 26.06 | 34.81 | |
| Low Profile G | 24.81 | 33.16 | | | 26.07 |
| Shrink mils/in | −0.52 | 0.17 | 0 | 0.14 | 0.14 |

TABLE 11B

| Component | 24498 | 24499 | 24500 | 24523 | 24524 |
|---|---|---|---|---|---|
| Resin D | | | 60.53 | 59.09 | 58.33 |
| Resin N | 52.19 | 60.93 | | | |
| Monomer B | 13 | 13 | 14.66 | 15.2 | 15.48 |
| Initiator B | | | 1.17 | 1.22 | 1.24 |
| Initiator D | 0.57 | 0.57 | | | |
| Inhibitor | 0.52 | 0.52 | 0.59 | 0.61 | 0.62 |
| Release Agent A | 6.24 | 6.24 | 7.04 | 7.29 | 7.43 |
| Graphite A | 400.62 | 400.62 | 451.61 | 468.09 | 476.78 |
| Modifier B | | | 18.77 | 23.1 | 25.39 |
| Modifier D | 5.83 | 5.83 | | | |
| Low Profile A | 6.5 | 6.5 | 7.33 | 7.6 | 7.74 |
| Low Profile E | | | | 25.71 | 26.19 |
| Low Profile H | 34.81 | | | | |
| Low Profile I | | 26.07 | 24.81 | | |
| Shrink mils/in | 0.23 | −0.33 | −0.29 | −0.45 | −0.66 |

TABLE 11C

| Component | 24498 | 24499 | 24500 | 24523 | 24524 |
|---|---|---|---|---|---|
| Resin D | 60.53 | | | 79.98 | 69.99 |
| Resin N | | 65.64 | 52.19 | | |
| Monomer B | 14.66 | 14.01 | 13 | | |
| Initiator B | 1.17 | | | 1.02 | 1.02 |
| Initiator D | | 0.62 | 0.57 | | |
| Inhibitor | 0.59 | 0.5 | 0.52 | 0.51 | 0.51 |
| Release Agent A | 7.04 | 6.72 | 6.24 | 6.11 | 6.11 |
| Graphite A | 451.61 | 431.61 | 400.62 | 376.97 | 376.97 |
| Modifier B | 18.77 | | | 18.44 | 18.44 |
| Modifier D | | 6.28 | 5.83 | | |
| Low Profile A | 7.33 | 7.01 | 6.5 | 6.37 | 6.37 |
| Low Profile J | 24.81 | 28.08 | 34.81 | | |

TABLE 11C-continued

| Component | 24498 | 24499 | 24500 | 24523 | 24524 |
|---|---|---|---|---|---|
| Low Profile K | | | | 20.02 | 30.01 |
| Shrink mils/in | −1.79 | −2.65 | −3.02 | | |

TABLE 12

| Component | 24633 | 24634 | 24635 | 24636 |
|---|---|---|---|---|
| Resin D | 60.01 | 79.98 | 69.99 | 60.01 |
| Initiator B | 1.02 | 1.02 | 1.02 | 1.02 |
| Inhibitor | 0.51 | 0.51 | 0.51 | 0.51 |
| Release Agent A | 6.11 | 6.11 | 6.11 | 6.11 |
| Graphite A | 376.97 | 376.97 | 376.96 | 376.97 |
| Modifier B | 18.44 | 18.44 | 18.44 | 18.44 |
| Low Profile A | 6.37 | 6.37 | 6.37 | 6.37 |
| Low Profile K | 39.99 | | | |
| Low Profile L | | 20.02 | 30.01 | 39.99 |

The examples of Tables 9 through 12 illustrate that acceptable shrink characteristics can be achieved using a low profile additive. In general, these samples had a shrink measurement of less absolute than two mils/in as measured by ASTM D792. Further the samples had improved surface characteristics including a smoother surface with the avoidance of roughness such as orange peel and ripple.

Figure 3:
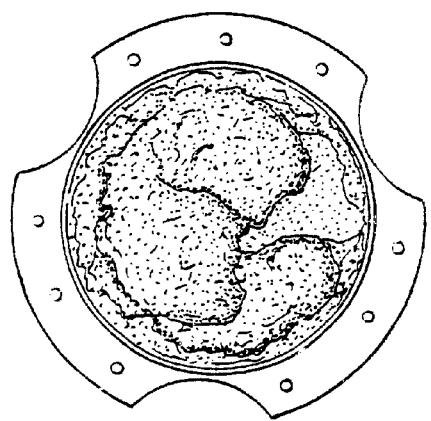
FIG. 3 is an illustration of a process failure for composition in accordance with the present invention molded using the convention hydraulic ram injection molding process.
Figure 4:
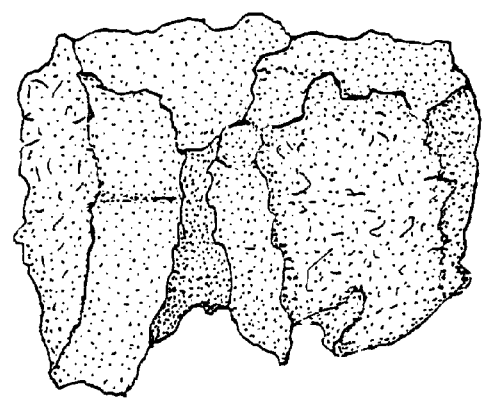
FIG. 4 is an illustration of the mold plug shown in FIG. 3.
Figure 5:
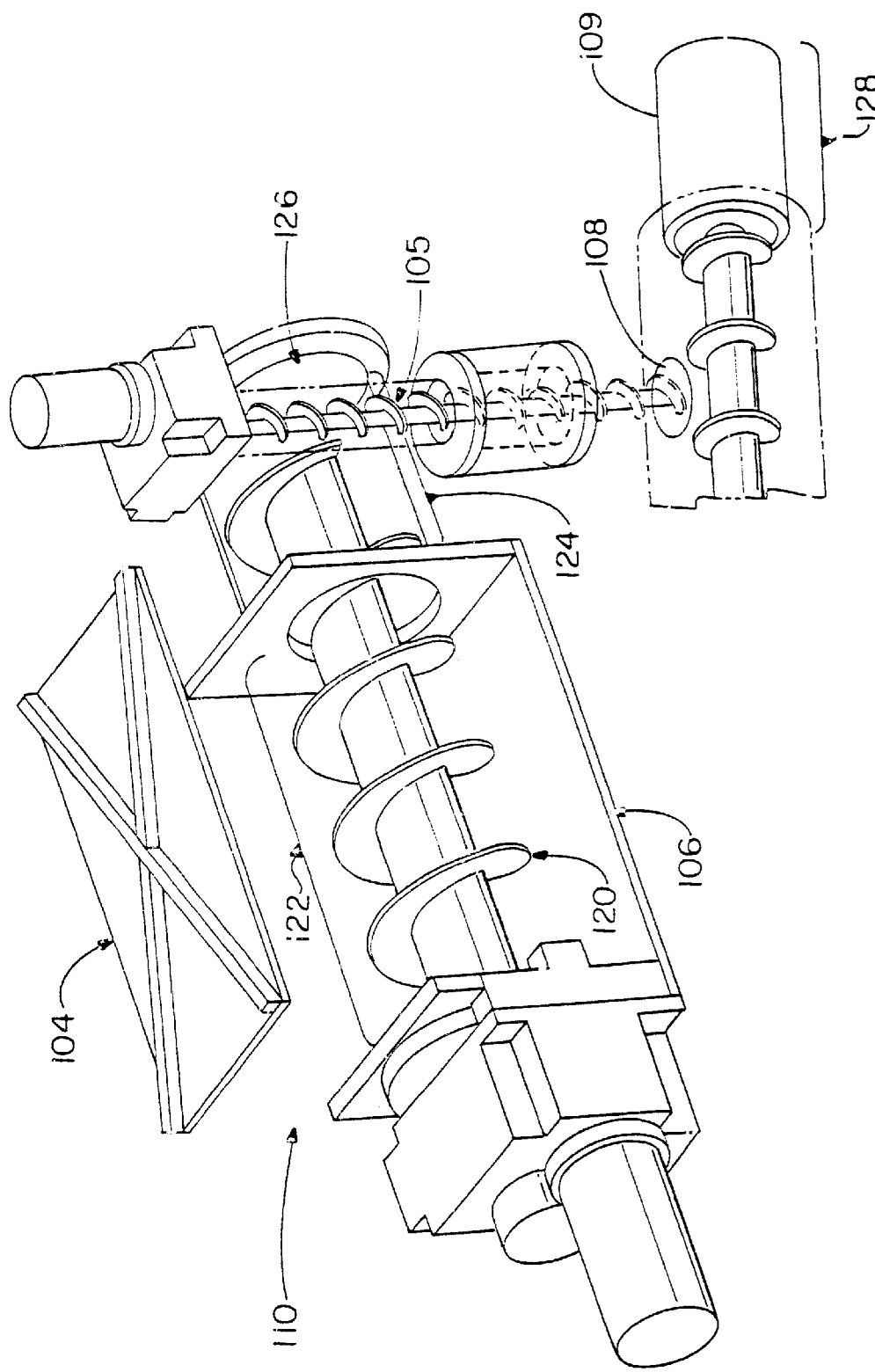
FIG. 5 is a schematic illustration of the molding equipment of the present invention.

In accordance with a further embodiment of the invention, the following compositions can be used in a new molding process to accomplish injection molding. In particular, as is illustrated in FIG. 5, the process of the present invention involves using a phenolic style screw 105, in a auger 106, to convey the highly loaded molding compositions of the present invention to the feed throat 108 of an injection molding apparatus 110. This process contrasts to the traditional process using a hydraulic ram to port the molding composition to the feed throat. However, the traditional molding methods and equipment would fail with potentially catastrophic results when the composition would pack out during the molding process. For example, FIGS. 3 and 4 are photographs of packing out at the feed throat, which occurred using a highly loaded composition such as Sample 23808 in the previously described apparatus. The composition was fed into a traditional injection molding machine, which uses an hydraulic ram to feed the composition from a screw barrel to the feed throat (i.e. a restricted orifice at the mold gate.) The composition packed out in the mold orifice.

In contrast to this situation, when the same composition was processed using a stuffer having a hopper with a auger having a vertical component, i.e. either substantially vertical, or at a vertical angle with respect to the horizontal plane of the injection molding machine, it could be molded into complex shapes compared to that of FIG. 1 using otherwise conventional injection molding techniques. It is more preferred that a double auger system having a stuffer 104 which comprises a hopper 106 with a first and larger horizontally oriented auger 120 which feeds the smaller vertical auger 105 feeding into a modified phenolic resin type screw in the feed throat 108 which ports directly into a single or double gate cavity mold 109. The first auger is a standard style and size auger; however, the vertical auger is a 90 mm outer diameter and approximately 35 inch length auger. The tip of this auger was modified by matching and blending into the feed throat area to eliminate any dead spots. The otherwise standard smear tip of the phenolic screw is modified from standard by machining to a constant inner diameter and a constant flight depth which was blended to a point at the end. A phenolic screw differs from other known screw configurations by the flight range, as well as by the fact that a phenolic screw does not include check rings. Further, the process involves some zoned temperature gradients with a first and second zone 122, 124 in the first screw barrel 126 each having a temperature, which can be the same or different, of from about 70 to about 140 degrees F., and more particularly about 70 to about 100 degrees F. (i.e. 70 F). It is also possible to take this temperature lower by using a chiller. A third zone 128 is located at the mold. This zone is maintained at about 275 to about 325 F, (i.e. 300 F) which is the temperature at which cure is initiated for most of the compositions in accordance with the invention. The examples were run using the parenthetical temperatures. Current work involves holding the first and the second zone both at 70 F. Earlier work involved having the first zone at 90–95F and the second zone at 110–125F. It is preferable to avoid temperature variations at the mold level. At normal cure rates, the mold time is typically around 10 to 600 seconds, or more usually 30 to 300 seconds or around one or two minutes. The process can be practiced for single or double gate cavity tools, or even for injection/compression processes in which the mold is slightly opened during fill and the mold is shut to compress the shot.

Figure 6:
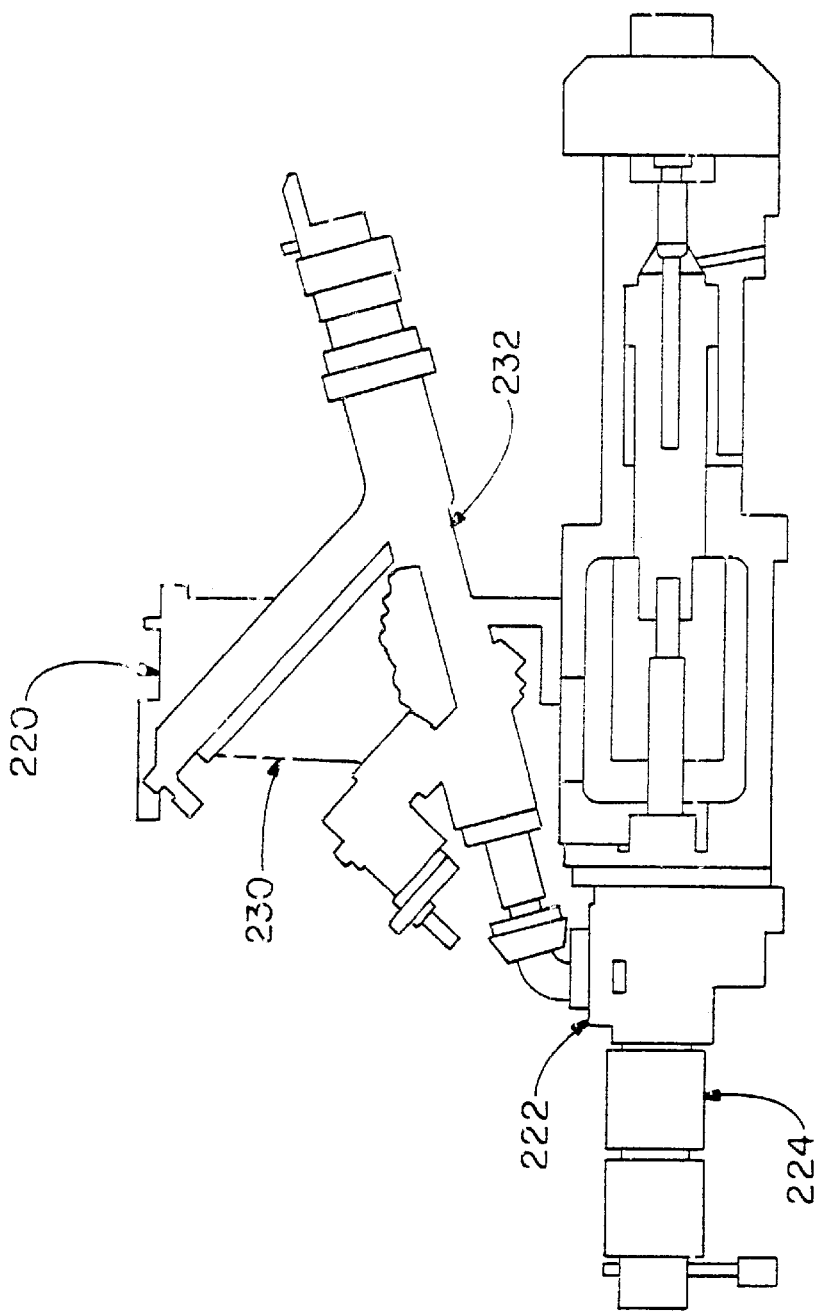
FIG. 6 is a schematic illustration of a further embodiment of the molding equipment of the present invention

It was also found that the composition could be molded by injection molding using an injection molding apparatus 220 shown in FIG. 6 comprising a single auger Krauss-Maffei AZ50 or AZ100 stuffer 220 with porting directly into the feed throat 222 of the injection molding machine 224. This machine has a angled rotating conical hopper 230 with a rotating auger screw 232. The angle has a vertical component in that it is between 30 and 60 degrees to the horizontal plane, and more particularly at about 45 degrees. Thus, this auger has a vertical component to its orientation. The stuffer needs to be sealed or semi-sealed to avoid drying of the compound.

EXAMPLES

Several hundred samples have been injection molded in the double auger equipment, before and after modification, using the process that has been described with the formulation set forth as L-23193. These samples have been molded as planar 7 by 10 inch rectangular test plaques using a single cavity mold and a mold time of 2 minutes. The thickness have included 0.053 inch, 0.100 inch, 0.120 inch, and 0.140 inch. A conductivity of at least about 50 S/cm has been achieved for the 0.053 thickness samples. Further, during the course of the development work, an improvement of at least about 100% increase from the starting values has been achieved, which is attributed chiefly to a reduction in shear during processing. It appears to be preferable to achieve a matte appearance on the finished sample.

In addition, a round disc sample has been successfully molded using the L-23193 formulation using a Krauss-Maffei injection molding machine with the AZ100 stuffer system.

While in accordance with the Patent Statutes, the best mode and preferred embodiment have been set forth, the scope of the invention is not limited thereto, but rather by the scope of the attached claims.

What is claimed is:

1. A process for molding a product from a composition in an injection molding apparatus having a feed throat which feeds a shot of composition into a mold, said composition comprising;
    a) an unsaturated prepolymer resin which comprises one or more of unsaturated polyester and vinyl ester resin;
    b) an unsaturated material copolymerizable with said resin and including a terminal ethylene group;
    c) an inorganic particulate conductive filler in an amount sufficient to provide a bulk conductivity of at least 40 S/cm to the resulting product; and
    d) an initiator to initiate said copolymerization; and
    wherein the composition is ported directly into the feed throat by an auger which has a vertical component to its positioning relative to the plane of the injection molding apparatus, and said shot is fed into the mold by a phenolic screw within the feed throat.

2. A process as set forth in claim 1 wherein the amount of said conductive filler is at least 50 weight percent.

3. A process as set forth in claim 2 wherein the filler is a graphite filler and the amount of said conductive filler is at least 60 weight percent.

4. A process as set forth in claim 1 wherein the composition further comprises an effective amount of a Theological modifier to prevent phase separation between said resin and said conductive filler during molding, said rheological modifier being one or more compositions selected from the group consisting of Group II oxides and hydroxides, carbodiamides, aziridines, polyisocyanates, polytetrafluoroethylene, perfluoropolyether, polyethylene and fumed silica.

5. A process as set forth in claim 4 wherein said composition is molded into a product which has an intricate pattern molded therein and has a thickness from about 0.050 to about 0.200 inches and a bulk conductivity of at least about 50 S/cm.

6. A process as set forth in claim 5 wherein said product is an electrochemical cell flow field plate.

7. A process as set forth in claim 6 wherein said conductive filler comprises a crystalline graphite particle and, and said unsaturated prepolymer resin is one or more resins selected from the group consisting of epoxy vinyl resin, bisphenol fumarate resin, modified bisphenol fumarate polyester resin, unsaturated polyester resin, urethane modified vinyl ester resin, bisphenol-epoxy vinylester resin, elastomer-modified vinyl ester resin, epoxy novolac vinyl ester resin and unsaturated isocyanurate vinyl ester resin.

8. A process as set forth in claim 7 wherein said auger is at an angle of from about 30 to about 60 from the horizontal plane of the injection molding apparatus.

9. A process as set forth in claim 8 wherein the auger is at an angle of from about 40 to about 50 degrees from the horizontal plane of the injection molding apparatus.

10. A process as set forth in claim 9 wherein the phenolic screw has a tip which is modified to a constant inner diameter and a constant flight depth.

11. A process as set for the in claim 1 wherein the auger is substantially vertical and is feed by a second auger which is substantially horizontal relative to the plane of the injection molding apparatus.

12. A process as set forth in claim 11 wherein the auger has been modified to match and blend into the feed throat area to eliminate any dead spots.

13. A process for molding a product from composition in an injection molding apparatus having a feed throat which feeds a shot of composition into a mold, said composition comprising;
    a) an unsaturated prepolymer resin which comprises one or more of unsaturated polyester and vinyl ester resin;
    b) an unsaturated material copolymerizable with said resin and including a terminal ethylene group;
    c) an inorganic particulate conductive filler in an amount of at least about 50 weight percent of the weight of the composition;

d) an initiator to initiate said copolymerization; and e) an effective amount of a rheological modifier to prevent phase separation between said resin and said conductive filler during molding, said rheological modifier being one or more compositions selected from the group consisting of Group II oxides and hydroxides, carbodiamides, aziridines, polyisocyanates, polytetrafluoroethylene, perfluoropolyether, polyethylene and fumed silica; and wherein the composition is ported directly into the feed throat by an auger which has a vertical component to its positioning relative to the plane of the injection molding apparatus, and said shot is fed into the mold by a phenolic screw within the feed throat.

14. A process as set forth in claim 13 wherein the filler is a graphite filler and the amount of said conductive filler is at least 60 weight percent.

15. A process as set forth in claim 14 wherein said composition is molded into a product which has an intricate pattern molded therein and has a thickness from about 0.050 to about 0.200 inches and a bulk conductivity of at least about 50 S/cm.

16. A process as set forth in claim 15 wherein said product is an electrochemical cell flow field plate.

17. A process as set forth in claim 16 wherein said conductive filler comprises a crystalline graphite particle and, and said unsaturated prepolymer resin is one or more resins selected from the group consisting of epoxy vinyl resin, bisphenol fumarate resin, modified bisphenol fumarate polyester resin, unsaturated polyester resin, urethane modified vinyl ester resin, bisphenol-epoxy vinyl ester resin, elastomer-modified vinyl ester resin, epoxy novolac vinyl ester resin and unsaturated isocyanurate vinyl ester resin.

18. A process as set forth in claim 13 wherein said auger is at an angle of from about 30 to about 60 from the horizontal plane of the injection molding apparatus.

19. A process as set forth in claim 18 wherein the auger is at an angle of from about 40 to about 50 degrees from the horizontal plane of the injection molding apparatus.

20. A process as set for the in claim 13 wherein the auger is substantially vertical and is feed by a second auger which is substantially horizontal relative to the plane of the injection molding apparatus.

21. A process as set forth in claim 13 wherein the phenolic screw has a tip which is modified to a constant inner diameter and a constant flight depth.

22. A process as set forth in claim 21 wherein the auger has been modified to match and blend into the feed throat area to eliminate any dead spots.

* * * * *